US011082190B2

(12) United States Patent
Tang et al.

(10) Patent No.: US 11,082,190 B2
(45) Date of Patent: Aug. 3, 2021

(54) CQI MEASUREMENT METHOD, APPARATUS, AND WIRELESS COMMUNICATIONS SYSTEM

(71) Applicant: HUAWEI TECHNOLOGIES CO., LTD., Guangdong (CN)

(72) Inventors: Hao Tang, Shanghai (CN); Zhengwei Gong, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/203,582

(22) Filed: Nov. 28, 2018

(65) Prior Publication Data

US 2019/0097781 A1    Mar. 28, 2019

Related U.S. Application Data

(63) Continuation of application No. PCT/CN2017/077555, filed on Mar. 21, 2017.

(30) Foreign Application Priority Data

May 30, 2016    (CN) .......................... 201610373060.7

(51) Int. Cl.
*H04W 76/27* (2018.01)
*H04L 5/00* (2006.01)
(Continued)

(52) U.S. Cl.
CPC .............. *H04L 5/0057* (2013.01); *H04L 1/00* (2013.01); *H04L 1/0026* (2013.01); *H04L 1/20* (2013.01);
(Continued)

(58) Field of Classification Search
CPC . H04L 5/0057; H04L 1/20; H04L 1/00; H04L 1/0026; H04L 5/0053;
(Continued)

(56) References Cited

U.S. PATENT DOCUMENTS

2008/0045231 A1    2/2008  Kuroda et al.
2011/0275396 A1*   11/2011 Nishio .................. H04L 5/0057
                                                        455/509
(Continued)

FOREIGN PATENT DOCUMENTS

CN    102118234 A    7/2011
CN    102158874 A    8/2011
(Continued)

OTHER PUBLICATIONS

LG Electronics: "CSI feedback for low complexity UEs", Oct. 2015, 3GPP Draft; R1-155372 CSI Feedback for Low Cost MTC, 3rd.*

(Continued)

*Primary Examiner* — Lakeram Jangbahadur
(74) *Attorney, Agent, or Firm* — Womble Bond Dickinson (US) LLP

(57) ABSTRACT

Embodiments of the present invention relate to the communications field, and provide a CQI measurement method, an apparatus, and a wireless communications system, to improve accuracy of downlink CQI measurement performed by UE. The CQI measurement method includes: determining, by a base station, a downlink CQI measurement resource, where the downlink CQI measurement resource is for use by a first UE to perform downlink CQI measurement, the downlink CQI measurement resource includes a frequency domain resource, and a bandwidth of the frequency domain resource is less than a system bandwidth; and sending, by the base station, resource indication information to the first UE, where the resource indication information is used to indicate the downlink CQI measurement resource.

16 Claims, 9 Drawing Sheets

(51) Int. Cl.
*H04L 1/00* (2006.01)
*H04L 1/20* (2006.01)
*H04W 24/08* (2009.01)
*H04W 24/10* (2009.01)
*H04W 72/04* (2009.01)

(52) U.S. Cl.
CPC ........... *H04W 24/08* (2013.01); *H04W 24/10* (2013.01); *H04W 72/042* (2013.01); *H04W 72/0446* (2013.01); *H04W 72/0453* (2013.01); *H04W 76/27* (2018.02); *H04L 5/0053* (2013.01)

(58) Field of Classification Search
CPC ......... H04W 72/0453; H04W 72/0446; H04W 72/042; H04W 24/10; H04W 24/08; H04W 76/27
See application file for complete search history.

(56) References Cited

U.S. PATENT DOCUMENTS

| | | | |
|---|---|---|---|
| 2012/0320778 A1 | 12/2012 | Lv et al. | |
| 2013/0129014 A1* | 5/2013 | Kim | H04B 7/0469 375/295 |
| 2013/0286884 A1* | 10/2013 | Li | H04B 7/0417 370/252 |
| 2013/0336174 A1* | 12/2013 | Rubin | H04J 3/14 370/280 |
| 2014/0126402 A1* | 5/2014 | Nam | H04B 7/0632 370/252 |
| 2015/0327246 A1 | 11/2015 | Kim et al. | |
| 2018/0049047 A1* | 2/2018 | Lin | H04W 24/02 |
| 2018/0279149 A1* | 9/2018 | Li | H04W 72/0446 |
| 2019/0149306 A1* | 5/2019 | Gao | H04L 5/0023 370/252 |

FOREIGN PATENT DOCUMENTS

| | | |
|---|---|---|
| CN | 102223726 A | 10/2011 |
| CN | 102255685 A | 11/2011 |
| CN | 104854902 A | 8/2015 |
| WO | 2016072784 A1 | 5/2016 |

OTHER PUBLICATIONS

LG Electronics:"CSI feedback for low complexity UEs", 3GPP Draft; R1-155372, Oct. 4, 2015, XP051039657, 4 pages.

* cited by examiner

CQI MEASUREMENT METHOD, APPARATUS, AND WIRELESS COMMUNICATIONS SYSTEM

CROSS-REFERENCE TO RELATED APPLICATIONS

This application is a continuation of International Application No. PCT/CN2017/077555, filed on Mar. 21, 2017, which claims priority to Chinese Patent Application No. 201610373060.7, filed on May 30, 2016. The disclosures of the aforementioned applications are hereby incorporated by reference in their entireties.

TECHNICAL FIELD

This application relates to the communications field, and in particular, to a channel quality indicator (CQI) measurement method, an apparatus, and a wireless communications system.

BACKGROUND

In a Long Term Evolution (LTE) or Long Term Evolution Advanced (LTE-A) network, a base station usually serves user equipment (UE) in a frequency division duplexing (FDD) or time division duplexing (TDD) mode. In the FDD or TDD mode, two UEs (for example, UE 1 and UE 2) that use a same frequency band within a same time may cause interference to each other. For example, uplink data sent by the UE 1 to the base station may interfere with downlink data sent by the base station to the UE 2. To eliminate the interference, the base station may place UEs with weak mutual interference into one UE group, and UEs in a same group may use a same frequency band within a same time or may use a same time on a same frequency band. UEs in different groups cannot use a same frequency band within a same time, or use a same time on a same frequency band.

To increase proper utilization of a current channel, the base station may usually select a proper resource, a proper modulation and coding scheme, and a proper transmission mode for UE based on a downlink CQI measured and reported by the UE. A frequently used downlink CQI measurement method is: UE measures average channel quality on an entire downlink system bandwidth to obtain a downlink CQI of the entire system bandwidth, and then the UE reports the downlink CQI to the base station.

However, in this CQI measurement process, an uplink signal sent by the UE 1 to the base station may interfere with a downlink signal sent by the base station to the UE 2. Therefore, to eliminate the interference, the base station may place the UE 1 and the UE 2 into different UE groups, but when measuring a downlink CQI, the UE 2 still treats the uplink signal sent by the UE 1 to the base station as an interference signal to the downlink signal sent by the base station to the UE 2. Consequently, the downlink CQI measured by the UE 2 is inaccurate.

SUMMARY

Embodiments of the present invention provide a CQI measurement method, an apparatus, and a wireless communications system, to improve accuracy of downlink CQI measurement performed by UE.

To achieve the foregoing objective, the following technical solutions are used in the embodiments of the present invention:

According to a first aspect, an embodiment of the present invention provides a CQI measurement method, including:

determining, by a base station, a downlink CQI measurement resource, where the downlink CQI measurement resource is for use by first user equipment UE to perform downlink CQI measurement, the downlink CQI measurement resource includes a frequency domain resource, and a bandwidth of the frequency domain resource is less than a system bandwidth; and sending, by the base station, resource indication information to the first UE, where the resource indication information is used to indicate the downlink CQI measurement resource.

In one embodiment of the present invention, the base station can determine the downlink CQI measurement resource for use by the first UE to perform downlink CQI measurement, and send and indicate the downlink CQI measurement resource to the first UE by using the resource indication information, and the bandwidth of the frequency domain resource included in the downlink CQI measurement resource is less than the system bandwidth. This can ensure that the first UE does not perform measurement on the entire system bandwidth when performing downlink CQI measurement. To be specific, when performing downlink CQI measurement, the first UE does not treat an uplink signal sent by another UE to the base station as an interference signal to a downlink signal sent by the base station to the first UE, thereby improving accuracy of downlink CQI measurement performed by the first UE.

Further, according to the CQI measurement method provided in this embodiment of the present invention, because the accuracy of downlink CQI measurement performed by the first UE can be improved, it can be ensured that the base station performs more accurate downlink channel quality estimation, facilitating allocation of a proper downlink resource to the first UE.

Optionally, in an embodiment of the present invention, after the sending, by the base station, resource indication information to the first UE, the CQI measurement method further includes:

receiving, by the base station, a downlink CQI measurement result from the first UE, where the downlink CQI measurement result includes a first CQI value measured by the first UE on the downlink CQI measurement resource.

Optionally, in an embodiment of the present invention, the downlink CQI measurement result further includes a first offset value, and the first offset value is used to indicate a difference between a second CQI value of a subband measured by the first UE and the first CQI value.

In one embodiment of the present invention, the UE reports a CQI value with respect to all resources in the downlink CQI measurement resource, that is, the first CQI value, so that the base station can obtain average channel quality of the downlink CQI measurement resource. Alternatively, the UE reports the first CQI value and first offset values used to indicate differences between second CQI values of subbands measured by the UE and the first CQI value, so that the base station can obtain average channel quality of the downlink CQI measurement resource and channel quality of some subbands. With these two manners for reporting the downlink CQI measurement result, the base station can better allocate a downlink resource to the UE.

Optionally, in an embodiment of the present invention, the sending, by the base station, resource indication information to the first UE includes:

sending, by the base station, a radio resource control RRC message or downlink control information DCI to the first UE, where the RRC message or the DCI includes the resource indication information.

In one embodiment of the present invention, the base station may add the resource indication information to one reserved field/some reserved fields in the RRC message or in the DCI, and send the reserved field/fields to the first UE. That is, the base station may send the resource indication information to the first UE by using the RRC message or the DCI. In this way, new message exchange may not need to be added to an interaction procedure between the base station and the first UE, reducing air interface overheads between the base station and the first UE.

Optionally, in one embodiment of the present invention, the determining, by a base station, a downlink CQI measurement resource includes:

determining, by the base station, the downlink CQI measurement resource from a system resource based on an uplink resource allocated to second UE by the base station, where the downlink CQI measurement resource is a resource in the system resource other than the uplink resource for the second UE, both the first UE and the second UE are served by the base station, and the first UE and the second UE belong to different UE groups.

In one embodiment of the present invention, because both the first UE and the second UE are served by the same base station, and the first UE and the second UE belong to different UE groups, when the downlink CQI measurement resource determined by the base station is a resource in the system resource other than the uplink resource for the second UE, it can be ensured that, when performing downlink CQI measurement on the downlink CQI measurement resource indicated to the first UE by the base station, the first UE does not treat an uplink signal sent by another UE to the base station as an interference signal to a downlink signal sent by the base station to the first UE.

According to a second aspect, an embodiment of the present invention provides a CQI measurement method, including:

receiving, by UE, resource indication information from a base station, where the resource indication information is used to indicate a downlink CQI measurement resource, the downlink CQI measurement resource includes a frequency domain resource, and a bandwidth of the frequency domain resource is less than a system bandwidth; and performing, by the UE, downlink CQI measurement on the downlink CQI measurement resource.

In one embodiment of the present invention, the UE can perform downlink CQI measurement on the downlink CQI measurement resource indicated by the resource indication information sent by the base station, and the bandwidth of the frequency domain resource included in the downlink CQI measurement resource is less than the system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

Further, according to the CQI measurement method provided in this embodiment of the present invention, because the accuracy of downlink CQI measurement performed by the first UE can be improved, it can be ensured that the base station performs more accurate downlink channel quality estimation, so that the UE can obtain a proper downlink resource allocated to the UE by the base station.

Optionally, in one embodiment of the present invention, after the performing, by the UE, downlink CQI measurement on the downlink CQI measurement resource, the downlink CQI measurement method further includes:

sending, by the UE, a downlink CQI measurement result to the base station, where the downlink CQI measurement result includes a first CQI value measured by the UE on the downlink CQI measurement resource.

Optionally, in one embodiment of the present invention, the downlink CQI measurement result further includes a first offset value, and the first offset value is used to indicate a difference between a second CQI value of a subband measured by the UE and the first CQI value.

Optionally, in one embodiment of the present invention, the performing, by the UE, downlink CQI measurement on the downlink CQI measurement resource includes:

performing, by the UE, downlink CQI measurement on the downlink CQI measurement resource within a first time period, where the first time period is a cycle for the UE to report the downlink CQI measurement result of downlink CQI measurement performed by the UE to the base station, or the first time period is from a subframe in which the base station sends, to the UE, an instruction instructing the UE to perform downlink CQI measurement, to a subframe in which the UE reports the downlink CQI measurement result to the base station.

Optionally, in one embodiment of the present invention, the receiving, by UE, resource indication information from a base station includes:

receiving, by the UE, an RRC message or DCI from the base station, where the RRC message or the DCI includes the resource indication information; and obtaining, by the UE, the resource indication information based on the RRC message or the DCI.

For specific descriptions of technical effects of the embodiments of the second aspect, refer to related descriptions of the technical effects of the embodiments of the first aspect, and details are not described herein again.

According to a third aspect, an embodiment of the present invention provides a base station, including:

a determining unit, configured to determine a downlink CQI measurement resource, where the downlink CQI measurement resource is for use by first UE to perform downlink CQI measurement, the downlink CQI measurement resource includes a frequency domain resource, and a bandwidth of the frequency domain resource is less than a system bandwidth; and a sending unit, configured to send resource indication information to the first UE, where the resource indication information is used to indicate the downlink CQI measurement resource determined by the determining unit.

In one embodiment of the present invention, the determining unit can determine the downlink CQI measurement resource for use by the first UE to perform downlink CQI measurement, and send and indicate the downlink CQI measurement resource to the first UE by using the resource indication information, and the bandwidth of the frequency domain resource included in the downlink CQI measurement resource is less than the system bandwidth. Therefore, it can be ensured that the first UE does not perform measurement on the entire system bandwidth when performing downlink CQI measurement. To be specific, when performing downlink CQI measurement, the first UE does not treat an uplink signal sent by another UE to the base station as an interference signal to a downlink signal sent by the base station to the first UE, thereby improving accuracy of downlink CQI measurement performed by the first UE.

Optionally, in one embodiment of the present invention, the base station further includes a receiving unit, where the receiving unit is configured to: after the sending unit sends the resource indication information to the first UE, receive a downlink CQI measurement result from the first UE, where the downlink CQI measurement result includes a first CQI value measured by the first UE on the downlink CQI measurement resource.

Optionally, in one embodiment of the present invention, the downlink CQI measurement result further includes a first offset value, and the first offset value is used to indicate a difference between a second CQI value of a subband measured by the first UE and the first CQI value.

Optionally, in one embodiment of the present invention, the sending unit is configured to send an RRC message or DCI to the first UE, where the RRC message or the DCI includes the resource indication information.

Optionally, in one embodiment of the present invention, the determining unit is configured to determine the downlink CQI measurement resource from a system resource based on an uplink resource allocated to second UE by the base station, where the downlink CQI measurement resource is a resource in the system resource other than the uplink resource for the second UE, both the first UE and the second UE are served by the base station, and the first UE and the second UE belong to different UE groups.

For specific descriptions of technical effects of the embodiments of the third aspect, refer to related descriptions of the technical effects of the embodiments of the first aspect, and details are not described herein again.

According to a fourth aspect, an embodiment of the present invention provides UE, including:

a receiving unit, configured to receive resource indication information from a base station, where the resource indication information is used to indicate a downlink CQI measurement resource, the downlink CQI measurement resource includes a frequency domain resource, and a bandwidth of the frequency domain resource is less than a system bandwidth; and a measurement unit, configured to perform downlink CQI measurement on the downlink CQI measurement resource received by the receiving unit.

In one embodiment of the present invention, the UE can perform downlink CQI measurement on the downlink CQI measurement resource indicated by the resource indication information sent by the base station, and the bandwidth of the frequency domain resource included in the downlink CQI measurement resource is less than the system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

Optionally, in one embodiment of the present invention, the UE further includes a sending unit, where the sending unit is configured to: after the measurement unit performs downlink CQI measurement on the downlink CQI measurement resource, send a downlink CQI measurement result to the base station, where the downlink CQI measurement result includes a first CQI value measured by the measurement unit on the downlink CQI measurement resource.

Optionally, in one embodiment of the present invention, the downlink CQI measurement result further includes a first offset value, and the first offset value is used to indicate a difference between a second CQI value of a subband measured by the measurement unit and the first CQI value.

Optionally, in one embodiment of the present invention, the measurement unit is configured to perform downlink CQI measurement on the downlink CQI measurement resource within a first time period, where the first time period is a cycle for the UE to report the downlink CQI measurement result of downlink CQI measurement performed by the UE to the base station, or the first time period is from a subframe in which the base station sends, to the UE, an instruction instructing the UE to perform downlink CQI measurement, to a subframe in which the UE reports the downlink CQI measurement result to the base station.

Optionally, in one embodiment of the present invention, the receiving unit is configured to: receive an RRC message or DCI from the base station, where the RRC message or the DCI includes the resource indication information; and obtain the resource indication information based on the RRC message or the DCI.

For specific descriptions of technical effects of the embodiments of the fourth aspect, refer to related descriptions of the technical effects of the embodiments of the second aspect, and details are not described herein again.

Optionally, in one embodiment of the present invention, in the first aspect to the fourth aspect, the frequency domain resource includes one set of to-be-measured subbands, and the one set of to-be-measured subbands includes at least one to-be-measured subband.

Optionally, in one embodiment of the present invention, in the first aspect to the fourth aspect, the resource indication information includes a number of the at least one to-be-measured subband.

In one embodiment of the present invention, the base station indicates, to the UE, the frequency domain resource for downlink CQI measurement, for example, using the number of the at least one to-be-measured subband to indicate, to the UE, the at least one to-be-measured subband. Therefore, when performing measurement on the at least one to-be-measured subband, the UE does not treat an uplink signal sent by another UE to the base station as an interference signal to a downlink signal sent by the base station to the UE, thereby improving accuracy of downlink CQI measurement performed by the UE.

Optionally, in one embodiment of the present invention, the downlink CQI measurement resource further includes a time domain resource, the frequency domain resource includes m sets of to-be-measured subbands, the time domain resource includes m to-be-measured time windows, the m sets of to-be-measured subbands are in a one-to-one correspondence with the m to-be-measured time windows, each set of to-be-measured subbands includes at least one to-be-measured subband, and each to-be-measured time window includes at least one to-be-measured subframe, where m is an integer greater than or equal to 1.

Optionally, in one embodiment of the present invention, the resource indication information includes m subband number sets, m start subframe numbers, and m subframes, there is a one-to-one correspondence between the m subband number sets, the m start subframe numbers, and the m subframes, each subband number set includes a number of at least one to-be-measured subband in one set of to-be-measured subbands, and the one set of to-be-measured subbands is one of the m sets of to-be-measured subbands.

In one embodiment of the present invention, the base station indicates, to the UE, the frequency domain resource and the time domain resource that are used for downlink CQI measurement, for example, using the m subband number sets, the m start subframe numbers corresponding to the m subband number sets, and the m subframes corresponding to the m start subframe numbers, to indicate, to the UE, the m sets of to-be-measured subbands and the m to-be-measured time windows corresponding to the m sets of to-be-measured subbands. Therefore, when performing measurement on the m sets of to-be-measured subbands and the m to-be-measured time windows corresponding to the m sets of to-be-measured subbands, the UE does not treat an uplink signal sent by another UE to the base station as an interference signal to a downlink signal sent by the base station to the UE, thereby improving accuracy of downlink CQI measurement performed by the UE.

According to a fifth aspect, an embodiment of the present invention provides a base station, including at least one processor, a transceiver, a memory, and a system bus, where the memory is configured to store a computer executable instruction; the at least one processor, the transceiver, and the memory are connected to each other and complete mutual communication, by using the system bus; and when the base station runs, the at least one processor executes the computer executable instruction stored in the memory, so that the base station performs the CQI measurement method according to any one of the first aspect and the optional implementations of the first aspect.

According to a sixth aspect, an embodiment of the present invention provides a computer readable storage medium, where the computer readable storage medium stores one or more programs, the one or more programs include a computer executable instruction, and when at least one processor of a base station executes the computer executable instruction, the base station performs the CQI measurement method according to any one of the first aspect and the optional implementations of the first aspect.

According to a seventh aspect, an embodiment of the present invention provides UE, including at least one processor, a transceiver, a memory, and a system bus, where the memory is configured to store a computer executable instruction; the at least one processor, the transceiver, and the memory are connected to each other and complete mutual communication, by using the system bus; and when the UE runs, the at least one processor executes the computer executable instruction stored in the memory, so that the UE performs the CQI measurement method according to any one of the second aspect and the optional implementations of the second aspect.

According to an eighth aspect, an embodiment of the present invention provides a computer readable storage medium, where the computer readable storage medium stores one or more programs, the one or more programs include a computer executable instruction, and when at least one processor of UE executes the computer executable instruction, the UE performs the CQI measurement method according to any one of the second aspect and the optional implementations of the second aspect.

According to a ninth aspect, an embodiment of the present invention provides a wireless communications system, where the wireless communications system includes a base station and UE, the base station may be the base station in any one of the third aspect and the optional implementations of the third aspect and the UE may be the UE in any one of the fourth aspect and the optional implementations of the fourth aspect; or the base station may be the base station in the fifth aspect, and the UE may be the UE in the seventh aspect.

According to the wireless communications system provided in one embodiment of the present invention, the wireless communications system includes the base station and the UE. The base station can determine a downlink CQI measurement resource for use by the UE to perform downlink CQI measurement, and indicate the downlink CQI measurement resource to the UE by using resource indication information, and a bandwidth of a frequency domain resource included in the downlink CQI measurement resource is less than a system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

Further, in the wireless communications system provided in this embodiment of the present invention, because the accuracy of downlink CQI measurement performed by first UE can be improved, it can be ensured that the base station performs more accurate downlink channel quality estimation, so that the UE can obtain a proper downlink resource allocated to the UE by the base station.

DESCRIPTION OF EMBODIMENTS

Figure 1:
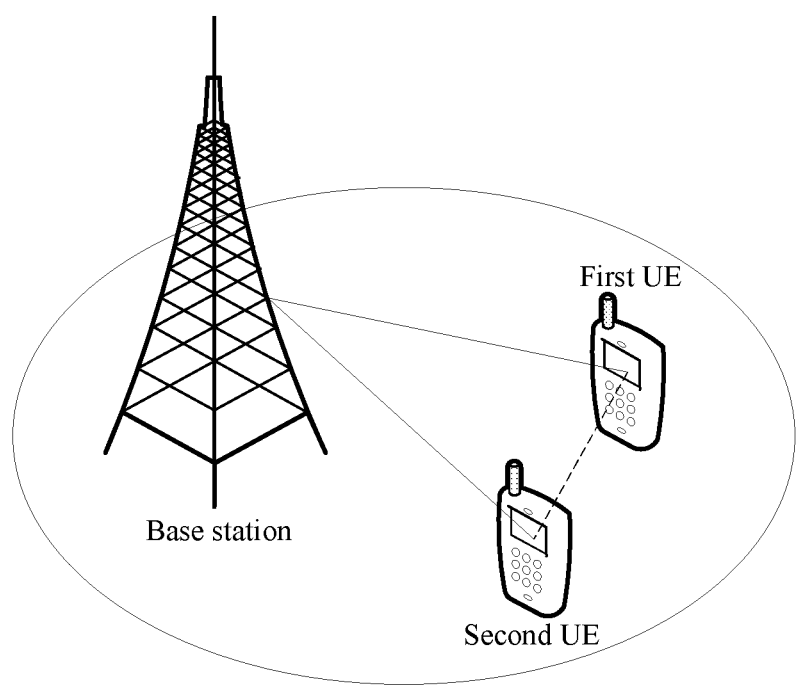
FIG. 1 is a schematic architecture diagram of a wireless communications system according to an embodiment of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may be understood as "A or B".

In the specification and claims of this application, the terms "first", "second", and so on are intended to distinguish between different objects, but are not intended to indicate a particular order of the objects. For example, first UE, second UE, and the like are intended to distinguish different UEs, but are not intended to indicate a particular order of the UEs.

Unless otherwise specified, "a plurality of" in the following embodiments of this application means "two or more than two". For example, a plurality of base stations means two or more than two base stations. In the following embodiments of this application, "a plurality of" and "at least two" may convey a same meaning, and both may mean "two or more than two" and are interchangeable.

In addition, in the embodiments of the present invention, expressions like "example" and "for example" are used to indicate that an example, an illustration, or a description is made. Any embodiment or design scheme described using "example" or "for example" in the embodiments of the present invention should not be interpreted as being more preferred or more advantageous than another embodiment or design scheme. To be exact, use of the expressions like "example" and "for example" is intended to give a specific presentation of a related concept.

In addition, the terms "including", "comprising", and any other variants thereof mentioned in descriptions of the embodiments of the present invention are intended to cover a non-exclusive inclusion. For example, a process, a method, a system, a product, or a device that includes a series of operations or units is not limited to the listed operations or units, but optionally may further include other unlisted operations or units, or optionally further include another inherent operation or unit of the process, the method, the product, or the device.

In the following description, for illustration rather than limitation, specific details such as a particular system structure, interface, and technology are provided to make a thorough understanding of the embodiments of the present invention. However, a person skilled in the art should know that this application may be practiced in other embodiments without these specific details. In other cases, detailed descriptions of well-known apparatuses, circuits, and methods are omitted, so that this application is described without being obscured by unnecessary details.

To describe a CQI measurement method in the embodiments of the present invention more clearly, the following provides descriptions for related concepts in the embodiments of the present invention.

To ensure transmission quality of a downlink signal of one UE, a base station needs to determine channel quality of a downlink channel between the base station and the UE when sending, the UE, the downlink signal (meaning a signal sent by the base station to the UE). The UE may measure the downlink channel to obtain a downlink CQI, and send the downlink CQI to the base station, so that the base station determines the channel quality of the downlink channel based on the downlink CQI. Therefore, when the quality of the downlink channel between the base station and the UE is relatively poor (for example, the channel quality is less than a preset channel quality threshold), the base station may allocate, to the UE, a new channel of better channel quality (for example, the channel quality is greater than or equal to the preset channel quality threshold), to transmit the downlink signal to the UE. In this way, the transmission quality of the downlink signal of the UE is ensured. Usually, the UE can measure average channel quality of an entire downlink system bandwidth when performing downlink CQI measurement, to obtain a downlink CQI of the entire system bandwidth.

The UE may receive interference from uplink signals of other surrounding UEs (meaning signals sent by the another UEs to the base station) during downlink signal transmission. Therefore, to avoid this interference, among UEs served by the base station, the base station may place UEs with no or relatively weak mutual interference (for example, interference between any two UEs is less than a preset interference threshold) into one UE group, and place UEs with relatively strong mutual interference (for example, interference between any two UEs is greater than or equal to the preset interference threshold) into different UE groups. Therefore, UEs in one group cause no interference or relatively weak interference to each other, and UEs in different groups cause relatively strong interference to each other. UEs in one group can use a same frequency band within a same time or use a same time on a same frequency band. UEs in different groups cannot use a same frequency band within a same time, or use a same time on a same frequency band.

After the base station groups the UEs served by the base station, UEs that use a same frequency band within a same time or use a same time on a same frequency band can be kept from interfering with each other. However, when performing downlink CQI measurement, one UE still treats an uplink signal of another UE not in a same group as the UE, as an interference signal to a downlink signal of the UE. Consequently, a downlink CQI measured by the UE is inaccurate.

To resolve this problem, to be specific, to improve accuracy of the downlink CQI measured by the UE, in the embodiments of the present invention, the base station may indicate, to the UE, a downlink CQI measurement resource for use by the UE to perform downlink CQI measurement. For example, for first UE served by the base station, a downlink CQI measurement resource indicated by the base station to the first UE is a resource in a system resource other than an uplink resource for second UE. Both the first UE and the second UE are served by a same base station, and the first UE and the second UE belong to different UE groups, meaning that the second UE is UE causing relatively strong interference to the first UE. In this way, because the first UE does not perform downlink CQI measurement on the uplink resource for the second UE when performing downlink CQI measurement on the downlink CQI measurement resource indicated by the base station, the first UE does not treat an uplink signal sent by the second UE to the base station as an interference signal to a downlink signal sent by the base station to the first UE. In this way, accuracy of downlink CQI measurement performed by the first UE can be improved.

In the embodiments of the present invention, the system resource means all resources allocatable by the base station. The resource includes a time domain resource and a frequency domain resource. The frequency domain resource may be an entire system bandwidth of the base station.

The CQI measurement method provided in the embodiments of the present invention may be applied to a wireless communications system. The wireless communications system may include one or more base stations and UE served by the base station or base stations. As shown in FIG. 1, FIG.

1 is a schematic architecture diagram of a possible wireless communications system according to an embodiment of the present invention. In the wireless communications system shown in FIG. 1, a base station and UE complete downlink CQI measurement by using the CQI measurement method provided in the embodiments of the present invention. For example, the base station determines a downlink CQI measurement resource for first UE, and sends resource indication information to the first UE to indicate the downlink CQI measurement resource to the first UE, so that the first UE can perform downlink CQI measurement on the downlink CQI measurement resource. The base station has indicated, to the first UE, the downlink CQI measurement resource for use by the first UE to perform downlink CQI measurement, and a bandwidth of a frequency domain resource included in the downlink CQI measurement resource is less than a system bandwidth. Therefore, the first UE does not perform measurement on the entire system bandwidth when performing downlink CQI measurement on the downlink CQI measurement resource. To be specific, when performing downlink CQI measurement, the first UE does not treat an uplink signal sent by another UE, for example, second UE, to the base station as an interference signal to a downlink signal sent by the base station to the first UE, thereby improving accuracy of downlink CQI measurement performed by the first UE.

Optionally, in one embodiment of the present invention, the base station may work in a full-duplex mode. That is, the base station may perform two-way signal transmission simultaneously. For example, the base station may simultaneously send a downlink signal to the first UE and receive an uplink signal sent by the second UE. The UE may work in a half-duplex mode. That is, the UE may transmit an uplink signal or receive a downlink signal, but cannot transmit an uplink signal and receive a downlink signal simultaneously. For example, the UE may transmit an uplink signal within a first time, and receive a downlink signal within a second time, but cannot transmit an uplink signal and receive a downlink signal simultaneously within the first time or the second time.

In one embodiment of the present invention, the base station may serve UE in an FDD mode or serve UE in a TDD mode, and no specific limitation is imposed thereon in this embodiment of the present invention.

Figure 2:
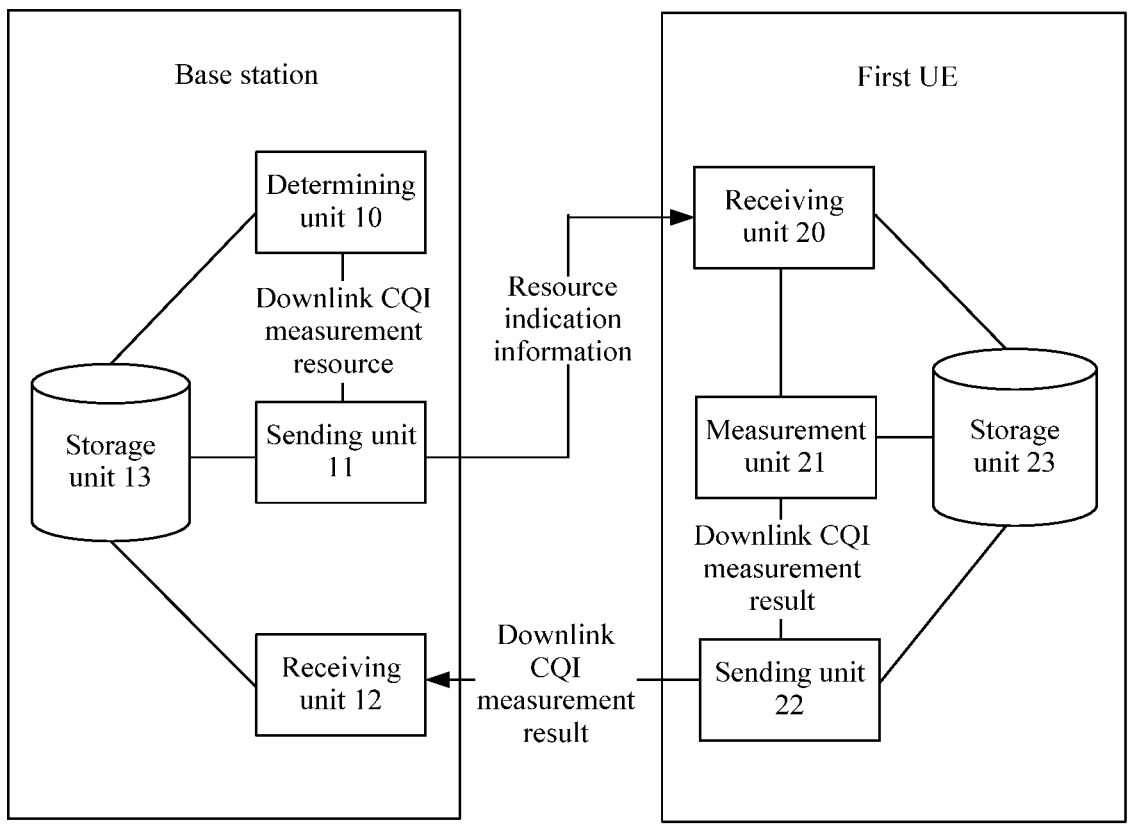
FIG. 2 is a schematic diagram of an interactive cooperation mode between a base station and UE according to an embodiment of the present invention.

The CQI measurement method provided in the embodiments of the present invention is applied to interaction between a base station and first UE. As shown in FIG. 2, FIG. 2 is a schematic diagram of a possible interactive cooperation mode between a base station and first UE according to an embodiment of the present invention. The following describes the CQI measurement method, an apparatus, and a system that is provided in the embodiments of the present invention based on FIG. 2 by using examples.

In the embodiments of the present invention, a base station may include a determining unit 10, a sending unit 11, and a receiving unit 12, and first UE may include a receiving unit 20, a measurement unit 21, and a sending unit 22.

After the determining unit 10 of the base station determines a downlink CQI measurement resource, where the downlink CQI measurement resource is for use by the first UE to perform downlink CQI measurement, the determining unit 10 of the base station sends the downlink CQI measurement resource to the sending unit 11 of the base station; the sending unit 11 of the base station sends, to the first UE, resource indication information used to indicate the downlink CQI measurement resource; after the receiving unit 20 of the first UE receives the resource indication information, the receiving unit 20 of the first UE sends the resource indication information to the measurement unit 21 of the first UE; the measurement unit 21 of the first UE performs downlink CQI measurement on the downlink CQI measurement resource indicated by the resource indication information, and the measurement unit 21 of the first UE sends a downlink CQI measurement result of downlink CQI measurement performed by the measurement unit 21 of the first UE to the sending unit 22 of the first UE; and the sending unit 22 of the first UE sends the downlink CQI measurement result to the base station, so that the receiving unit 12 of the base station receives the downlink CQI measurement result and then the base station can learn, based on the downlink CQI measurement result, of a quality of a channel between the base station and the UE. This helps the base station select a channel of better channel quality for the UE, and transmission quality of a downlink signal of the UE can be ensured.

Optionally, the determining unit 10 of the base station determines a downlink CQI measurement resource once at an interval of a fixed time period, and within the fixed time period, the measurement unit 21 of the first UE performs downlink CQI measurement based on a downlink CQI measurement resource indicated by resource indication information within the fixed time period. In this way, the base station only needs to indicate a downlink CQI measurement resource to the first UE once within a fixed time period, thereby reducing air interface overheads between the base station and the first UE.

Further, in one embodiment of the present invention, the downlink CQI measurement resource determined by the base station, the resource indication information sent by the base station, and the downlink CQI measurement result received by the base station may be stored in a storage unit 13 of the base station. The resource indication information and the downlink CQI measurement resource that are received by the first UE and the result of downlink CQI measurement performed by the first UE may be stored in a storage unit 23 of the first UE.

Unit/module division of the base station and the UE, and method procedures performed by units/modules of the base station and the UE, are detailed in the following apparatus embodiments.

The wireless communications system provided in one embodiment of the present invention may be a Universal Mobile Telecommunications System (UMTS), a Code Division Multiple Access (CDMA) system, a wireless local area network (WLAN), a communications system using a 5th generation mobile communications (5G) technology, or the like.

In the embodiments of the present invention, the base station may be a distributed base station, a cloud random access network (cloud RAN, CRAN) device, an access network device that includes a radio access network controller and a base station, or the like. The distributed base station or the CRAN device may include a base band unit (BBU) and a remote radio unit (RRU). The CRAN device may be further a CRAN device with flexible layering of protocols. The CRAN device with flexible layering of protocols includes an enhanced BBU and an enhanced RRU, and the enhanced BBU and the enhanced RRU may both have some or all of wireless protocol layers. The wireless protocol layers include a Packet Data Convergence Protocol (PDCP) layer, a Radio Link Control (RLC) layer, a Media Access Control (MAC) layer, and a physical layer (PHY), and the RRU further includes a radio frequency (RF) part.

The UE may be a wireless terminal. The wireless terminal may be a device that provides voice and/or data connectivity for a user, a handheld device having a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone), or a computer provided with a mobile terminal, for example, a portable, pocket-sized, handheld, computer built-in, or in-vehicle mobile apparatus that exchanges voice and/or data with the radio access network. The wireless terminal may be, for example, a personal communications service (PCS) phone, a cordless phone, a Session Initiation Protocol (SIP) phone set, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, user equipment (UE), or the like.

Figure 3:
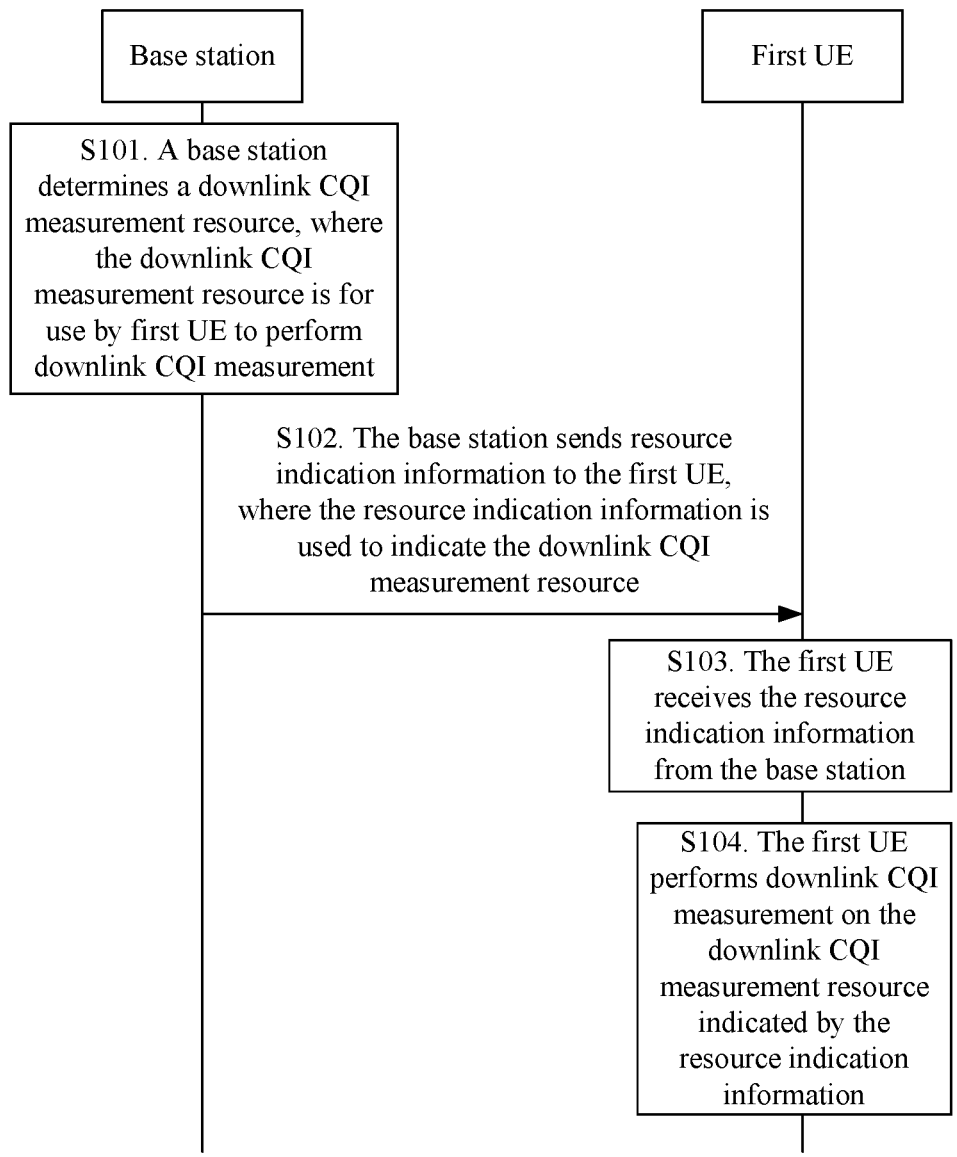
FIG. 3 is schematic flowchart 1 of a CQI measurement method according to an embodiment of the present invention.

Based on the wireless communications system provided in the embodiments of the present invention, an embodiment of the present invention provides a CQI measurement method. As shown in FIG. 3, the CQI measurement method may include the following operations.

Operation S101. A base station determines a downlink CQI measurement resource, where the downlink CQI measurement resource is for use by first UE to perform downlink CQI measurement.

The downlink CQI measurement resource includes a frequency domain resource, and a bandwidth of the frequency domain resource is less than a system bandwidth.

In one embodiment of the present invention, the downlink CQI measurement resource is a resource in a system resource other than an uplink resource for second UE, both the first UE and the second UE are served by a same base station, and the first UE and the second UE belong to different UE groups. Therefore, the bandwidth of the frequency domain resource included in the downlink CQI measurement resource is less than the system bandwidth (to be specific, is a bandwidth in the system bandwidth other than a bandwidth for the uplink resource for the second UE).

In one embodiment of the present invention, the base station may serve a plurality of UEs. The plurality of UEs includes the first UE and the second UE. To help better understand the CQI measurement method provided in the embodiments of the present invention, in all embodiments of the present invention, the CQI measurement method in the embodiments of the present invention is described by using interaction between one of the plurality of UEs, that is, the first UE, and the base station as an example. The second UE is UE that causes relatively strong interference to the first UE.

It should be noted that in this embodiment of the present invention, there may be one or more second UEs, which depends on actual circumstances and is not limited in this embodiment of the present invention.

Optionally, in one embodiment of the present invention, the uplink resource for the second UE includes a time domain resource and a frequency domain resource. Therefore, to ensure that the downlink CQI measurement resource for use by the first UE to perform downlink CQI measurement is other than the uplink resource for the second UE, the downlink CQI measurement resource may be a frequency domain resource, or may be a time domain resource and a frequency domain resource. Detailed descriptions are to be provided in the following embodiments, and omitted for now.

Operation S102. The base station sends resource indication information to the first UE, where the resource indication information is used to indicate the downlink CQI measurement resource.

Operation S103. The first UE receives the resource indication information from the base station.

Operation S104. The first UE performs downlink CQI measurement on the downlink CQI resource indicated by the resource indication information.

According to the CQI measurement method provided in one embodiment of the present invention, the base station can determine the downlink CQI measurement resource for use by the first UE to perform downlink CQI measurement, and the bandwidth of the frequency domain resource included in the downlink CQI measurement resource is less than the system bandwidth. Therefore, the first UE does not perform measurement on the entire system bandwidth when performing downlink CQI measurement on the downlink CQI measurement resource. To be specific, when performing downlink CQI measurement, the UE does not treat an uplink signal sent by another UE to the base station as an interference signal to a downlink signal sent by the base station to the first UE, thereby improving accuracy of downlink CQI measurement performed by the first UE.

Further, according to the CQI measurement method provided in an embodiment of the present invention, because the accuracy of downlink CQI measurement performed by the first UE can be improved, it can be ensured that the base station performs more accurate downlink channel quality estimation, facilitating allocation of a proper downlink resource to the first UE.

Optionally, specific implementation of the downlink CQI measurement resource may be one of the following.

(1) The downlink CQI measurement resource includes one set of to-be-measured subbands, and this set of to-be-measured subbands includes at least one to-be-measured subband.

Correspondingly, the resource indication information used to indicate the downlink CQI measurement resource includes a number of the at least one to-be-measured subband.

In this embodiment of the present invention, the system bandwidth may be divided into several subbands, and each subband may be numbered separately. For example, 1, 2, 3, and the like may be used to number the subbands.

For example, it is assumed that the set of to-be-measured subbands includes three to-be-measured subbands: a to-be-measured subband 1, a to-be-measured subband 2, and a to-be-measured subband 3. Then, the resource indication information may be expressed by {1;2;3}. 1 is used to indicate the to-be-measured subband 1, 2 is used to indicate the to-be-measured subband 2, and 3 is used to indicate the to-be-measured subband 3.

The quantity of to-be-measured subbands included in the set of to-be-measured subbands is merely an example, and does not limit this embodiment of the present invention in any sense. The quantity may be determined depending on an actual use requirement, and is not limited in this embodiment of the present invention.

(2) The downlink CQI measurement resource includes m sets of to-be-measured subbands and m to-be-measured time windows. The m sets of to-be-measured subbands are in a one-to-one correspondence with the m to-be-measured time windows, each set of to-be-measured subbands includes at least one to-be-measured subband, and each to-be-measured time window includes at least one to-be-measured subframe, where m is an integer greater than or equal to 1.

Correspondingly, the resource indication information used to indicate the downlink CQI measurement resource includes m subband number sets, m start subframe numbers, and m subframes. There is a one-to-one correspondence between the m subband number sets, the m start subframe numbers, and the m subframes, each subband number set includes a number of at least one to-be-measured subband in one set of to-be-measured subbands, and the one set of to-be-measured subbands is one of the m sets of to-be-measured subbands.

In a wireless communications system, assuming that a radio frame is 10 milliseconds, the radio frame may include 10 subframes. Each subframe is 1 millisecond. 10 subframes in one radio frame may be a subframe 0, a subframe 1, and a subframe 9.

In an embodiment of the present invention, the start subframe number is a number of a $1^{st}$ subframe with which the first UE can start downlink CQI measurement, and the subframe quantity is a quantity of continuous subframes in which the first UE can perform downlink CQI measurement.

In this embodiment of the present invention, for specific descriptions of subband numbering, refer to related descriptions of the subband numbering in the downlink CQI measurement resource of implementation (1), and details are not described herein again.

For example, it is assumed that the downlink CQI measurement resource includes two sets of to-be-measured subbands and two to-be-measured time windows corresponding to the two sets of to-be-measured subbands, that each set of to-be-measured subbands includes three to-be-measured subbands, and that each to-be-measured time window includes three subframes. Three subbands in one set of to-be-measured subbands are a to-be-measured subband 1, a to-be-measured subband 2, and a to-be-measured subband 3, three subframes of a to-be-measured time window corresponding to the set of to-be-measured subbands are a subframe 0, a subframe 1, and a subframe 2, three to-be-measured subbands in another set of to-be-measured subbands are the to-be-measured subband 3, a to-be-measured subband 4, and a to-be-measured subband 5, and three subframes of a to-be-measured time window corresponding to this set of to-be-measured subbands are a subframe 4, a subframe 5, and a subframe 6. Therefore, the resource indication information may be expressed by {{1,2,3};0,3; {3,4,5};4,3}. {{1,2,3};0,3} indicates the one set of to-be-measured subbands and the to-be-measured time window corresponding to this set of to-be-measured subbands, and {{3,4,5};4,3} indicates the another set of to-be-measured subbands and the to-be-measured time window corresponding to this set of to-be-measured subbands. In {{1,2,3};0,3}, {1,2,3} represents a subband number set of the one set of to-be-measured subbands, to be specific, is used to indicate the to-be-measured subband 1, the to-be-measured subband 2, and the to-be-measured subband 3; 0 represents a start subframe number (that is, starting with the subframe 0) of the to-be-measured time window corresponding to this set of to-be-measured subbands; and 3 represents a subframe quantity of to-be-measured subframes in the to-be-measured time windows (that is, starting with the subframe 0, the first UE performs downlink CQI measurement on three continuous subframes: the subframe 0, the subframe 1, and the subframe 2). In {{3,4,5};4,3}, {3,4,5} represents a subband number set of the another set of to-be-measured subbands, to be specific, used to indicate the to-be-measured subband 3, the to-be-measured subband 4, and the to-be-measured subband 5; 4 represents a subframe number (that is, starting with the subframe 4) of the to-be-measured time window corresponding to the set of to-be-measured subbands; and 3 represents a subframe quantity of to-be-measured subframes in the to-be-measured time windows (that is, starting with the subframe 4, the first UE performs downlink CQI measurement on three continuous subframes: the subframe 4, the subframe 5, and the subframe 6).

The quantity of sets of to-be-measured subbands, the quantity of to-be-measured subbands included in the set of to-be-measured subbands, the quantity of to-be-measured time windows, and the quantity of to-be-measured subframes included in the to-be-measured time window are merely an example, and do not limit this embodiment of the present invention in any sense. The quantities may be determined depending on actual use requirements, and are not limited in this embodiment of the present invention.

In an embodiment of the present invention, the downlink CQI measurement resource indicated to the first UE by the base station is a resource in the system resource other than the uplink resource for the second UE (for example, a frequency domain resource that can be used by the UE to perform downlink CQI measurement, or a time domain resource and a frequency domain resource that can be used by the UE to perform downlink CQI measurement). This means that the downlink CQI measurement resource for use by the first UE to perform downlink CQI measurement has excluded an uplink resource occupied by an uplink signal from the second UE that interferes with a downlink signal of the first UE. Therefore, when performing downlink CQI measurement, the first UE does not treat the uplink signal from the second UE as an interference signal to the downlink signal of the first UE, thereby improving accuracy of downlink CQI measurement performed by the first UE.

Optionally, with reference to FIG. 3, in the CQI measurement method provided in an embodiment of the present invention, operation S104 may include:

Operation S104a. The first UE performs downlink CQI measurement on the downlink CQI measurement resource within a first time period.

The first time period may be a cycle for the first UE to report the downlink CQI measurement result to the base station, that is, a CQI reporting cycle; or the first time period may be a time period from a subframe in which the base station sends a downlink CQI measurement instruction to the first UE, to a subframe in which the first UE reports the downlink CQI measurement result to the base station.

The downlink CQI measurement instruction may be a CQI report request message. The following embodiments and accompanying drawings are all described by using an example in which the downlink CQI measurement instruction is a CQI report request message.

Figure 4:
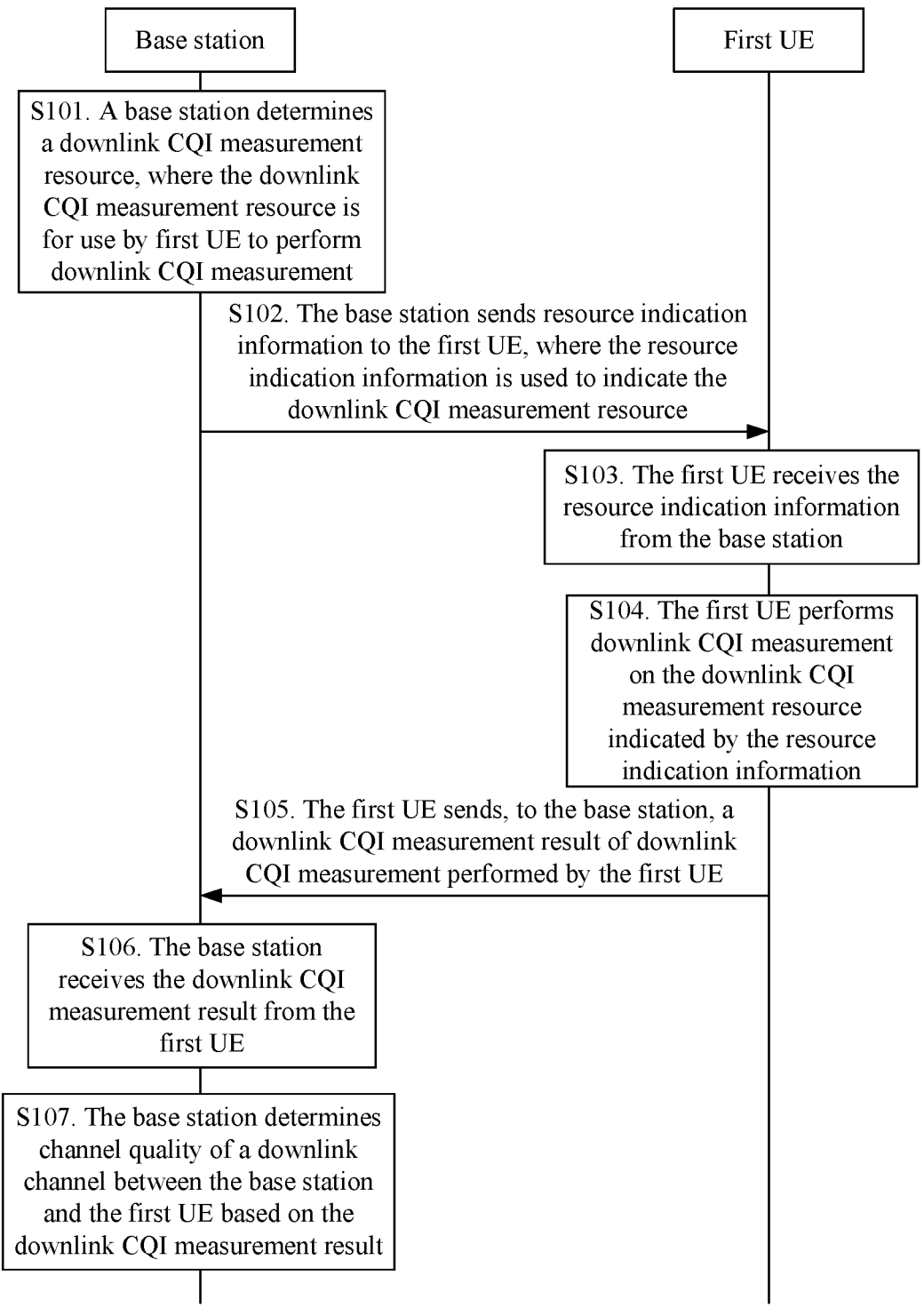
FIG. 4 is schematic flowchart 2 of a CQI measurement method according to an embodiment of the present invention.

Optionally, with reference to FIG. 3, as shown in FIG. 4, in the CQI measurement method provided in one embodiment of the present invention, after operation S104, the CQI measurement method may further include operations S105 to S107.

Operation S105. The first UE sends, to the base station, a downlink CQI measurement result of downlink CQI measurement performed by the first UE.

The downlink CQI measurement result may include a first CQI value measured by the first UE on the downlink CQI measurement resource. Alternatively, the downlink CQI measurement result may include a first CQI value measured by the first UE on the downlink CQI measurement resource and a first offset value. The first offset value is used to indicate a difference between a second CQI value of a subband measured by the first UE and the first CQI value.

During specific implementation, the first UE may usually measure a plurality of subbands. Therefore, there is also a plurality of second CQI values for the subbands measured by the first UE, and there is also a plurality of first offset values. Each first offset value is used to indicate a difference between a second CQI value of a subband measured by the first UE and the first CQI value.

For example, it is assumed that the first UE needs to measure second CQI values of three subbands: a CQI 1 of a subband 1, a CQI 2 of a subband 2, and a CQI 3 of a subband 3. Then, there are three first offset values: an offset value 1 corresponding to the CQI 1, an offset value 2 corresponding to the CQI 2, and an offset value 3 corresponding to the CQI 3. The offset value 1 is used to indicate a difference between the CQI 1 and the first CQI value, the offset value 2 is used to indicate a difference between the CQI 2 and the first CQI value, and the offset value 3 is used to indicate a difference between the CQI 3 and the first CQI value.

The downlink CQI measurement result sent by the first UE to the base station may include the first CQI value, or the downlink CQI measurement result may include the first CQI value, the offset value 1, the offset value 2, and the offset value 3.

When the downlink CQI measurement result includes the first CQI value, the base station may learn, based on the downlink CQI measurement result, of average channel quality of the downlink CQI measurement resource. When the downlink CQI measurement result includes the first CQI value, the offset value 1, the offset value 2, and the offset value 3, the base station may learn, based on the downlink CQI measurement result, of average channel quality of the downlink CQI measurement resource and channel quality of the subbands 1, 2, and 3.

Optionally, in an embodiment of the present invention, an LTE standard has specified three manners for the first UE to send the downlink CQI measurement result to the base station (that is, the three manners may be used in S105 to send the downlink CQI measurement result to the base station): reporting a wideband CQI, reporting a CQI of a subband selected by the first UE, and reporting a CQI of a subband indicated by the base station.

The wideband CQI in an embodiment of the present invention is a CQI measured by the first UE on the downlink CQI measurement resource indicated by the base station (that is, all resources in the system resource other than the uplink resource for the second UE). This CQI may be used to indicate average channel quality of the downlink CQI measurement resource.

If the manner in which the first UE sends the downlink CQI measurement result to the base station is reporting the wideband CQI, the downlink CQI measurement result sent by the first UE to the base station includes the first CQI value measured by the first UE on the downlink CQI measurement resource. If the manner in which the first UE sends the downlink CQI measurement result to the base station is reporting the CQI of the subband selected by the first UE or reporting the CQI of the subband indicated by the base station, the downlink CQI measurement result sent by the first UE to the base station includes the first CQI value measured by the first UE on the downlink CQI measurement resource and the first offset value (the first offset value is a difference between a CQI value of the subband that is selected by the first UE and measured by the first UE and the first CQI value, or the first offset value is a difference between the CQI value of the subband that is indicated by the base station and measured by the first UE and the first CQI value).

Corresponding to the manner of reporting the CQI of the subband selected by the first UE, subbands that need to be measured by the first UE are selected by the first UE; corresponding to the manner of reporting the CQI of the subband indicated by the base station, subbands that need to be measured by the first UE are indicated to the first UE by the base station. When the subbands that need to be measured by the first UE are indicated to the first UE by the base station, the base station may send subband numbers of these subbands to the first UE, so as to indicate the subbands to the first UE.

In one embodiment, when the subbands that need to be measured by the first UE are selected by the first UE, a correspondence between the first offset values and differences indicated by the first offset values (differences between second CQI values of the subbands measured by the first UE and the first CQI value) is shown in Table 1. For example, as listed in Table 1, the first offset value 00 may be used to indicate a case in which the difference is less than or equal to 1; the first offset value 01 may be used to indicate a case in which the difference is equal to 2; the first offset value 10 may be used to indicate a case in which the difference is equal to 3; and the first offset value 11 may be used to indicate a case in which the difference is greater than or equal to 4.

TABLE 1

| First offset value corresponding to a subband selected by the first UE | Difference between a second CQI value and the first CQI value |
| --- | --- |
| 00 | ≤1 |
| 01 | 2 |
| 10 | 3 |
| 11 | ≥4 |

Optionally, in an embodiment of the present invention, the first UE indicates, to the base station by using these two bits (that is, the first offset value), channel quality of the subband measured by the first UE. This can reduce air interface overheads between the first UE and the base station.

After receiving the first offset values and the first CQI value from the first UE, the base station can learn of average channel quality of the downlink CQI measurement resource based on the first CQI value and learn, based on the first offset values, of the channel quality of the subbands corresponding to the first offset values. In this way, a proper downlink resource is allocated to the first UE based on the average channel quality of the downlink CQI measurement resource and the channel quality of these subbands.

One or more subbands may be selected by the first UE. The selection may depend on an actual use requirement, and is not limited in this embodiment of the present invention.

In another implementation, when the subbands that need to be measured by the first UE are indicated to the first UE by the base station, a correspondence between the first offset values and differences indicated by the first offset values (differences between second CQI values of the subbands measured by the first UE and the first CQI value) is shown in Table 2. For example, as listed in Table 2, the first offset value 00 may be used to indicate a case in which the difference is equal to 0; the first offset value 01 may be used to indicate a case in which the difference is equal to 1; the first offset value 10 may be used to indicate a case in which the difference is greater than or equal to 2; and the first offset value 11 may be used to indicate a case in which the difference is less than or equal to −1.

TABLE 2

| First offset value corresponding to a subband indicated to the first UE by the base station | Difference between a second CQI value and the first CQI value |
|---|---|
| 00 | 0 |
| 01 | 1 |
| 10 | ≥2 |
| 11 | ≤−1 |

Optionally, in an embodiment of the present invention, the first UE indicates, to the base station by using these two bits (that is, the first offset value), channel quality of the subbands measured by the first UE. This can reduce air interface overheads between the first UE and the base station.

After receiving the first offset values and the first CQI value from the first UE, the base station can learn of average channel quality of the downlink CQI measurement resource based on the first CQI value and learn, based on the first offset values, of the channel quality of the subbands corresponding to the first offset values. In this way, a proper downlink resource is allocated to the first UE based on the average channel quality of the downlink CQI measurement resource and the channel quality of these subbands.

One or more subbands may be indicated to the first UE by the base station. The selection may depend on an actual use requirement, and is not limited in this embodiment of the present invention.

It should be noted that, in some embodiments of the present invention, the expressions of first offset values in Table 1 and Table 2 are merely examples for description, and do not limit these embodiments of the present invention in any sense. How the first offset value is expressed may depend on an actual circumstance. For example, the first offset value may be expressed by using more bits. This is not limited in this embodiment of the present invention.

Operation S106. The base station receives the downlink CQI measurement result from the first UE.

Operation S107. The base station determines channel quality of a downlink channel between the base station and the first UE based on the downlink CQI measurement result.

In an embodiment of the present invention, when the downlink CQI measurement result sent by the first UE to the base station includes the first CQI value, after the base station receives the downlink CQI measurement result, for example, if the base station determines that average channel quality of the downlink CQI measurement resource is less than a preset channel quality threshold, the base station may indicate to the first UE that sending of the downlink signal is suspended, or instruct the first UE to make a cell handover, a base station change, or the like. On the contrary, if the base station determines that average channel quality of the downlink CQI measurement resource is greater than or equal to the preset channel quality threshold, the base station may continue to use the current channel (the channel between the base station and the first UE) to send the downlink signal to the first UE.

When the downlink CQI measurement result sent by the first UE to the base station includes the first CQI value and the first offset values, if the base station determines that average channel quality of the downlink CQI measurement resource is less than a preset channel quality threshold, and the base station determines that channel quality of subbands corresponding to the first offset values is also less than the preset channel quality threshold, the base station may indicate, to the first UE, that sending of the downlink signal is suspended, or instruct the first UE to make a cell handover, a base station change, or the like; or if the base station determines that average channel quality of the downlink CQI measurement resource is less than a preset channel quality threshold, and the base station determines that channel quality of some of subbands corresponding to the first offset values is greater than or equal to the preset channel quality threshold, the base station may select these subbands to send the downlink signal to the first UE. On the contrary, if the base station determines that average channel quality of the downlink CQI measurement resource is greater than or equal to the preset channel quality threshold, and the base station determines that channel quality of some of subbands corresponding to the first offset values is also greater than or equal to the preset channel quality threshold, the base station may preferentially select these subbands to send the downlink signal to the first UE; or if the base station determines that average channel quality of the downlink CQI measurement resource is greater than or equal to the preset channel quality threshold, and the base station determines that channel quality of subbands corresponding to the first offset values is less than the preset channel quality threshold, the base station may continue to use the current channel (the channel between the base station and the first UE) to send the downlink signal to the first UE.

Optionally, in an embodiment of the present invention, the manner in which the first UE sends the downlink CQI measurement result to the base station may be periodic sending or non-periodic sending. If the manner in which the first UE sends the downlink CQI measurement result to the base station is periodic sending, operation S104 is also performed periodically. In this case, a time between sending of two consecutive downlink CQI measurement results to the base station by the first UE is referred to as one CQI reporting cycle, that is, the first time period. If the manner in which the first UE sends the downlink CQI measurement result to the base station is non-periodic sending, operation S104 is also performed non-periodically. In this case, a time period from a subframe in which the base station sends a downlink CQI measurement instruction to the first UE to a subframe in which the first UE reports the downlink CQI measurement result to the base station is referred to as a time of one CQI reporting, that is, the first time period. For different implementations of the downlink CQI measurement resource, manners in which the first UE performs downlink CQI measurement and sends the downlink CQI measurement result to the base station are described separately in detail, by using periodic sending and non-periodic sending as examples.

I. The first UE periodically sends the downlink CQI measurement result to the base station.

If the manner in which the first UE sends the downlink CQI measurement result to the base station is periodic sending, the first UE needs to perform downlink CQI measurement periodically. In this case, the first UE needs to perform downlink CQI measurement once within each CQI reporting cycle.

Because the first UE needs to perform downlink CQI measurement once within each CQI reporting cycle, and the same downlink CQI measurement resource is used for downlink CQI measurement in all CQI reporting cycles by the first UE, to reduce air interface overheads between the base station and the first UE, the base station may indicate the downlink CQI measurement resource to the first UE only once. When the downlink CQI measurement resource for downlink CQI measurement by the first UE remains unchanged, the base station does not need to indicate the downlink CQI measurement resource to the first UE repeatedly. Correspondingly, the first UE performs downlink CQI measurement on the downlink CQI measurement resource indicated by the base station, until the base station indicates a next downlink CQI measurement resource to the first UE.

(10) In terms of the downlink CQI measurement resource of implementation (1), the base station indicates, to the first UE, no time domain resource for use by the first UE to perform downlink CQI measurement, and the first UE needs to send, within each CQI reporting cycle, a downlink CQI measurement result of downlink CQI measurement performed by the first UE. Therefore, the time domain resource for use by the first UE to perform downlink CQI measurement may be any one or more subframes within each CQI reporting cycle.

In one embodiment, the downlink CQI measurement resource may be one set of to-be-measured subbands, and a bandwidth occupied by this set of to-be-measured subbands is less than a system bandwidth. In other words, this set of to-be-measured subbands includes a subband in the system bandwidth other than a subband occupied by an uplink resource for the second UE. In this set of to-be-measured subbands, the first UE may perform downlink CQI measurement in any subframe within each CQI reporting cycle, and sends a downlink CQI measurement result of downlink CQI measurement performed by the first UE to the base station at a CQI reporting time point (for example, a time point at which a CQI reporting cycle ends).

Figure 5:
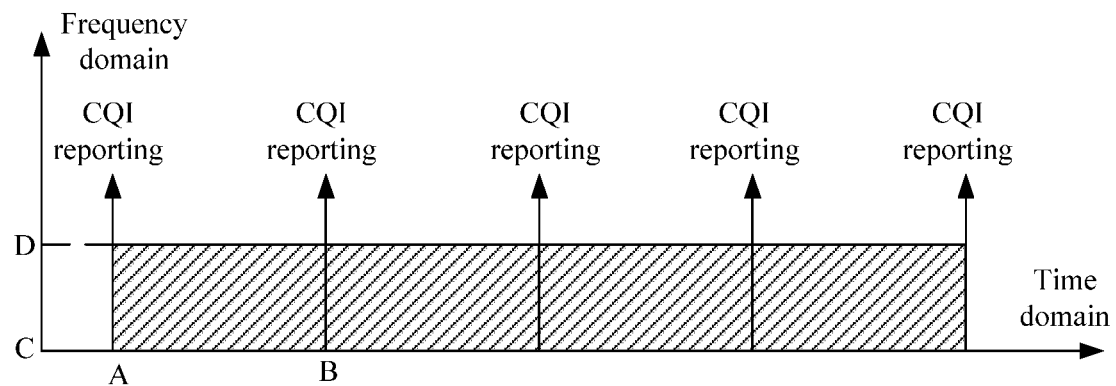
FIG. 5 is schematic diagram 1 of a downlink CQI measurement and reporting manner according to an embodiment of the present invention.

For example, as shown in FIG. 5, one CQI reporting cycle is between A and B (two CQI reportings), and a downlink CQI measurement resource indicated by the resource indication information, to be specific, one set of to-be-measured subbands, is between C and D. This set of to-be-measured subbands includes at least one to-be-measured subband. When the first UE periodically sends the downlink CQI measurement result to the base station, the resource indication information sent by the base station to the first UE includes a number of the at least one to-be-measured subband. For example, the resource indication information includes numbers of all subbands located between C and D, and these numbers are used to indicate that the first UE performs downlink CQI measurement on all the subbands located between C and D. In one embodiment, in any one or more subframes within each CQI reporting cycle, the first UE can perform downlink CQI measurement on a to-be-measured subband corresponding to the number of the at least one to-be-measured subband.

(11) In terms of the downlink CQI measurement resource of implementation (2), both the time domain resource and the frequency domain resource for use by the first UE to perform downlink CQI measurement are indicated by the resource indication information sent by the base station.

In one embodiment, the downlink CQI measurement resource may be m sets of to-be-measured subbands and m to-be-measured time windows. The m sets of to-be-measured subbands are in a one-to-one correspondence with the m to-be-measured time windows. Within each CQI reporting cycle, the m sets of to-be-measured subbands include a subband in the system bandwidth other than a subband occupied by an uplink resource for the second UE, and the m to-be-measured time windows include a subframe within the CQI reporting cycle other than a subframe occupied by the uplink resource for the second UE. In any one or more subframes in each to-be-measured time window within each CQI reporting cycle, the first UE may perform downlink CQI measurement on the m sets of to-be-measured subbands, and send a downlink CQI measurement result of downlink CQI measurement performed by the first UE to the base station at a CQI reporting time point (for example, a time point at which a CQI reporting cycle ends).

Figure 6:
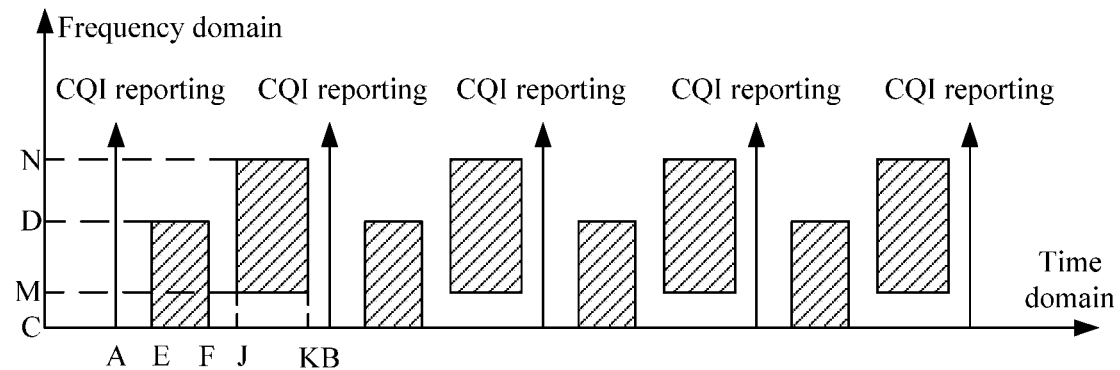
FIG. 6 is schematic diagram 2 of a downlink CQI measurement and reporting manner according to an embodiment of the present invention.

For example, as shown in FIG. 6, one CQI reporting cycle is between A and B (two CQI reportings); frequency domain resources of the downlink CQI measurement resource indicated by the resource indication information, to be specific, two set of to-be-measured subbands, are between C and D and between M and N, where each set of to-be-measured subbands includes at least one to-be-measured subband; and time domain resources of the downlink CQI measurement resource indicated by the resource indication information, to be specific, two to-be-measured time windows, are located between E and F and between J and K, where each to-be-measured time window includes a start subframe number and a subframe quantity corresponding to the start subframe number. A set 1 of to-be-measured subbands is between C and D, and correspondingly a to-be-measured time window is between E and F; and a set 2 of to-be-measured subbands is between M and N, and correspondingly a to-be-measured time window 2 is between J and K. When the first UE periodically sends the downlink CQI measurement result to the base station, the resource indication information sent by the base station to the first UE includes m subband number sets, m start subframe numbers, and m subframes. There is a one-to-one correspondence between the m subband number sets, the m start subframe numbers, and the m subframes. For example, the resource indication information includes numbers of all subframes located between E and F and correspondingly numbers of all subbands between C and D, and numbers of all subframes located between J and K and correspondingly numbers of all subbands between M and N. These numbers are used to indicate that the first UE performs downlink CQI measurement in any one or more subframes located between E and F and on all subbands between C and D, and performs downlink CQI measurement in any one or more subframes located between J and K and on all subbands between M and N. In this embodiment, as shown in FIG. 6, the set 1 of to-be-measured subbands is between C and D, and correspondingly E is a start subframe number of the to-be-measured time window 1 and (F−E+1) is a quantity of subframes in the to-be-measured time window 1; the set 2 of to-be-measured subbands is between M and N, J is a start subframe number of a to-be-measured time window 2, and (K−J+1) is a quantity of subframes in the to-be-measured time window 2. Within each reporting cycle, the first UE performs, in any one or more subframes of all to-be-measured subframes determined by each start subframe number and a subframe quantity corresponding to the start subframe number, downlink CQI measurement on a to-be-measured subband determined by a subband number set that is corresponding to the start subframe number and the subframe quantity.

II. The first UE non-periodically sends the downlink CQI measurement result to the base station.

If the manner in which the first UE sends the downlink CQI measurement result to the base station is non-periodic sending, the first UE needs to perform downlink CQI measurement non-periodically. In this case, the first UE performs downlink CQI measurement when the base station requests the first UE to report the downlink CQI measurement result.

It should be noted that for specific descriptions of the manner in which the base station indicates the downlink CQI measurement resource to the first UE, refer to related descriptions of the manner to the downlink CQI measurement resource of implementation (1), in which the base station indicates the downlink CQI measurement resource to the first UE, and details are not described herein again.

In one embodiment, it is assumed that the base station sends a CQI report request message to the first UE in a subframe N, that is, the first UE receives, in the subframe N, the CQI report request message sent by the base station, and that the base station requests the first UE to send the downlink CQI measurement result to the base station in a subframe N+4.

(12) In terms of the downlink CQI measurement resource of implementation (1), because the base station indicates, to the first UE, no time domain resource for downlink CQI measurement, the time domain resource for use by the first UE to perform downlink CQI measurement may be any one or more subframes between the subframe N and the subframe N+4.

In one embodiment, the downlink CQI measurement resource may be one set of to-be-measured subbands, and a bandwidth occupied by this set of to-be-measured subbands is less than a system bandwidth. In other words, this set of to-be-measured subbands includes a subband in the system bandwidth other than a subband occupied by an uplink resource for the second UE. In this set of to-be-measured subbands, the first UE may perform downlink CQI measurement in any one or more subframes of the subframe N, a subframe N+1, a subframe N+2, and a subframe N+3, and send, to the base station in the subframe N+4, the downlink CQI measurement result of downlink CQI measurement performed by the first UE.

Figure 7:
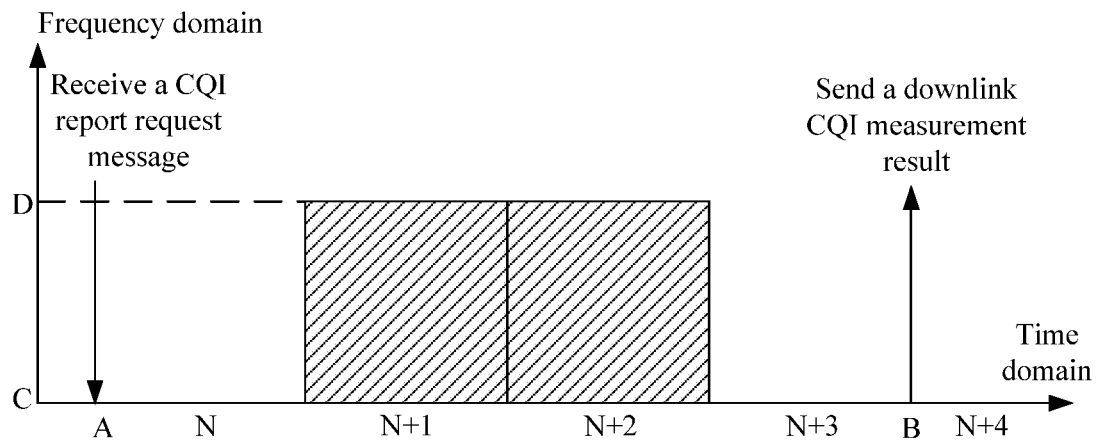
FIG. 7 is schematic diagram 3 of a downlink CQI measurement and reporting manner according to an embodiment of the present invention.

For example, as shown in FIG. 7, a time of one CQI reporting is between A and B (between reception by the first UE of a CQI report request message sent by the base station and sending of a downlink CQI measurement result to the base station by the first UE). The downlink CQI measurement resource indicated by the resource indication information, to be specific, one set of to-be-measured subbands, is between C and D. This set of to-be-measured subbands includes at least one to-be-measured subband. When the first UE non-periodically sends the downlink CQI measurement result to the base station, the resource indication information sent by the base station to the first UE includes a number of the at least one to-be-measured subband. For example, the resource indication information includes numbers of all subbands located between C and D, and these numbers are used to indicate that the first UE performs downlink CQI measurement on all the subbands located between C and D. In this embodiment, within a time of one CQI reporting, that is, in any one or more subframes of the subframe N, the subframe N+1, the subframe N+2, and the subframe N+3, the first UE can perform downlink CQI measurement on a to-be-measured subband corresponding to the number of the at least one to-be-measured subband.

(13) In terms of the downlink CQI measurement resource of implementation (2), both the time domain resource and the frequency domain resource for use by the first UE to perform downlink CQI measurement are indicated by the resource indication information sent by the base station.

In one embodiment, the downlink CQI measurement resource may be m sets of to-be-measured subbands and m to-be-measured time windows. The m sets of to-be-measured subbands are in a one-to-one correspondence with the m to-be-measured time windows. Within each CQI reporting time, the m sets of to-be-measured subbands include at least one to-be-measured subband, and the m to-be-measured time windows may be a set including any one or more subframes of the subframe N, the subframe N+1, the subframe N+2, and the subframe N+3. The at least one to-be-measured subband includes a subband in the system bandwidth other than a subband occupied by an uplink resource for the second UE. The m to-be-measured time windows include a subframe within the CQI reporting time other than a subframe occupied by the uplink resource for the second UE. In any one or more subframes of the subframe N, the subframe N+1, the subframe N+2, and the subframe N+3 that are within each CQI reporting time, the first UE may perform downlink CQI measurement on all subbands determined by the m sets of to-be-measured subbands, and send, to the base station in the subframe N+4, the downlink CQI measurement result of downlink CQI measurement performed by the first UE.

Figure 8:
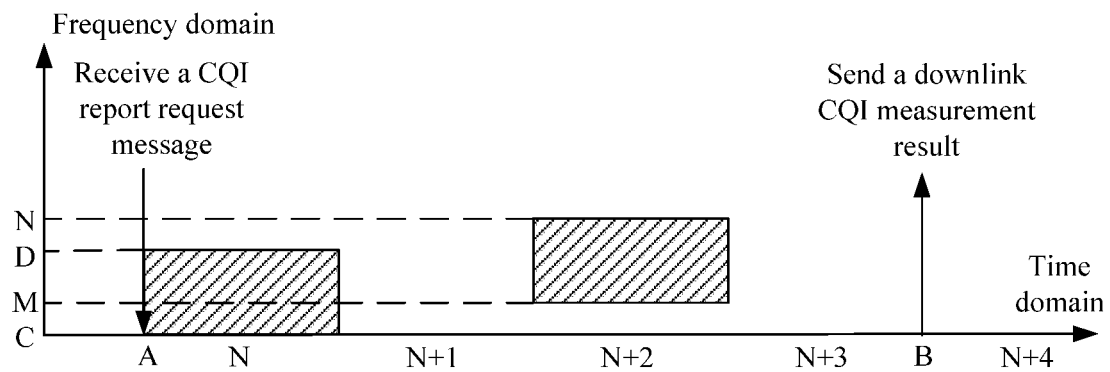
FIG. 8 is schematic diagram 4 of a downlink CQI measurement and reporting manner according to an embodiment of the present invention.

For example, as shown in FIG. 8, a time of one CQI reporting is between A and B. When the first UE non-periodically sends the downlink CQI measurement result to the base station, the resource indication information sent by the base station to the first UE includes m subband number sets, m start subframe numbers, and m subframes. There is a one-to-one correspondence between the m subband number sets, the m start subframe numbers, and the m subframes. For example, the resource indication information includes numbers of all subbands located between C and D and a start subframe number N and a subframe quantity 1 that are corresponding to these numbers, and numbers of all subbands between M and N and another start subframe number N+2 and a subframe quantity 1 that are corresponding to these numbers. The numbers of all the subbands located between C and D and the start subframe number N and the subframe quantity 1 that are corresponding to these numbers, and the numbers of all the subbands between M and N and the start subframe number N+2 and the subframe quantity 1 that are corresponding to these numbers, are used to indicate that the first UE performs downlink CQI measurement on subbands corresponding to the numbers of all the subbands located between C and D in the subframe N and on subbands corresponding to the numbers of all the subbands located between M and N in the subframe N+2. In one embodiment, within a time of one CQI reporting, in any one or more subframes in all to-be-measured subframes determined by each start subframe number and a subframe quantity corresponding to the start subframe number, the first UE can perform downlink CQI measurement on a to-be-measured subband determined by a subband number set that is corresponding to the start subframe number and the subframe quantity.

It should be noted that in one embodiment of the present invention, among the three manners specified by the LTE standard for the first UE to send the downlink CQI measurement result to the base station, the reporting of the wideband CQI and the reporting of the subband CQI of the subband selected by the first UE may be applied to not only a scenario in which the first UE periodically sends the downlink CQI measurement result to the base station, but also a scenario in which the first UE non-periodically sends the downlink CQI measurement result to the base station. The reporting the subband CQI of the subband indicated by the base station may be applied to a scenario in which the first UE non-periodically sends the downlink CQI measurement result to the base station.

Optionally, with reference to FIG. 3, in the CQI measurement method provided in an embodiment of the present invention, operation S102 may include operations S102a or S102b:

Operation S102a. The base station sends a radio resource control (radio resource control, RRC) message to the first UE, where the RRC message includes the resource indication information.

The RRC message may be an RRC connection setup message, an RRC resource configuration message, an RRC resource reconfiguration message, or the like. No specific limitation is imposed thereon in this embodiment of the present invention. In one embodiment of the present invention, the base station may add the resource indication information to one reserved field/some reserved fields of an existing RRC message, and send the reserved field/fields to the first UE.

Operation S102b. The base station sends downlink control information (downlink control information, DCI) to the first UE, where the DCI includes the resource indication information.

In one embodiment of the present invention, the base station may add the resource indication information to one reserved field/some reserved fields of existing DCI, and send the reserved field/fields to the first UE.

In one embodiment of the present invention, the base station sends the resource indication information to the first UE by using the RRC message or the DCI, without a need to add new message exchange to an interaction procedure between the base station and the first UE, thereby reducing air interface overheads between the base station and the first UE.

Optionally, in one embodiment of the present invention, a new message may alternatively be defined. The base station sends the resource indication information to the first UE by using the new message. In this case, although new message exchange needs to be added to an interaction procedure between the base station and the first UE, an existing RRC message or existing DCI does not need to be changed. Therefore, it is convenient to implement the CQI measurement method provided in this embodiment of the present invention.

Optionally, with reference to FIG. 3, in the CQI measurement method provided in one embodiment of the present invention, operation S101 may include:

Operation S101a. The base station determines the downlink CQI measurement resource from a system resource based on an uplink resource allocated to second UE by the base station.

In an embodiment of the present invention, when UEs served by the base station need to communicate, the UEs may request the base station to allocate resources for the UEs. For example, the first UE needs to receive a downlink signal, and the second UE needs to transmit an uplink signal. In this case, the base station allocates a downlink resource to the first UE, and allocates an uplink resource to the second UE. After the base station allocates the resources to the first UE and the second UE, because the second UE is UE that causes relatively strong interference to the first UE, when performing downlink CQI measurement, the first UE may treat an uplink signal of the second UE as an interference signal to a downlink signal of the first UE. Therefore, to keep the first UE from being interfered with by the uplink signal of the second UE during downlink CQI measurement, the base station may determine, from the system resource and based on the uplink resource allocated for the second UE by the base station, the downlink CQI measurement resource for use by the first UE to perform downlink CQI measurement. In other words, the base station may determine a resource in the system resource other than the uplink resource for the second UE, as the downlink CQI measurement resource for use by the first UE to perform downlink CQI measurement, so as to ensure that the first UE is kept from being interfered with by the uplink signal of the second UE during downlink CQI measurement, thereby improving accuracy of downlink CQI measurement performed by the first UE.

Figure 9:
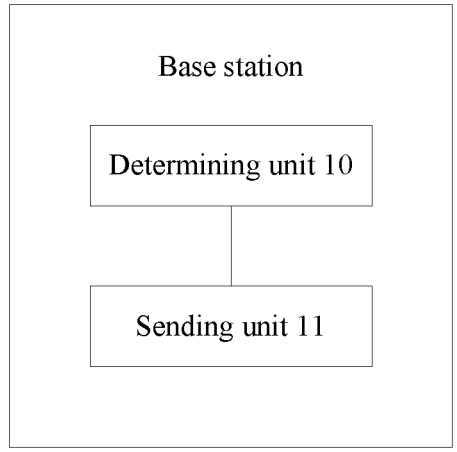
FIG. 9 is schematic structural diagram 1 of a base station according to an embodiment of the present invention.

As shown in FIG. 9, an embodiment of the present invention provides a base station. The base station is configured to perform operations performed by the base station in the foregoing method. The base station may include modules corresponding to relevant operations. For example, the base station may include:

a determining unit 10, configured to determine a downlink CQI measurement resource, where the downlink CQI measurement resource is for use by first UE to perform downlink CQI measurement, the downlink CQI measurement resource includes a frequency domain resource, and a bandwidth of the frequency domain resource is less than a system bandwidth; and a sending unit 11, configured to send resource indication information to the first UE, where the resource indication information is used to indicate the downlink CQI measurement resource determined by the determining unit 10.

Optionally, the frequency domain resource includes one set of to-be-measured subbands, and the one set of to-be-measured subbands includes at least one to-be-measured subband.

Optionally, the resource indication information includes a number of the at least one to-be-measured subband.

Optionally, the downlink CQI measurement resource further includes a time domain resource, the frequency domain resource includes m sets of to-be-measured subbands, the time domain resource includes m to-be-measured time windows, the m sets of to-be-measured subbands are in a one-to-one correspondence with the m to-be-measured time windows, each set of to-be-measured subbands includes at least one to-be-measured subband, and each to-be-measured time window includes at least one to-be-measured subframe, where m is an integer greater than or equal to 1.

Optionally, the resource indication information includes m subband number sets, m start subframe numbers, and m subframes, there is a one-to-one correspondence between the m subband number sets, the m start subframe numbers, and the m subframes, each subband number set includes a number of at least one to-be-measured subband in one set of to-be-measured subbands, and the one set of to-be-measured subbands is one of the m sets of to-be-measured subbands.

Figure 10:
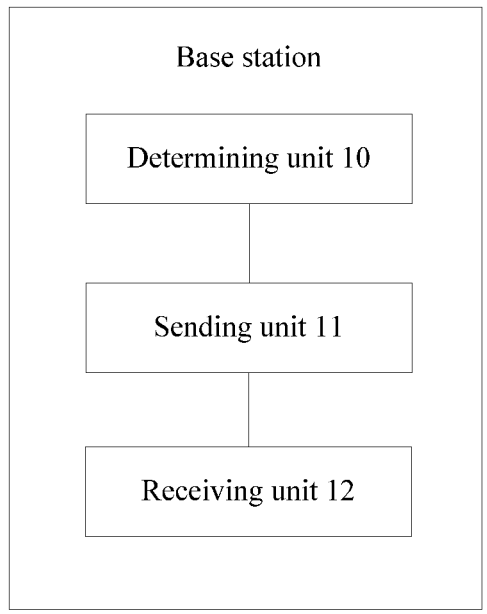
FIG. 10 is schematic structural diagram 2 of a base station according to an embodiment of the present invention.

Optionally, with reference to FIG. 9, as shown in FIG. 10, the base station in this embodiment of the present invention may further include a receiving unit 12.

The receiving unit 12 is configured to: after the sending unit 11 sends the resource indication information to the first UE, receive a downlink CQI measurement result from the first UE. The downlink CQI measurement result includes a first CQI value measured by the first UE on the downlink CQI measurement resource.

Optionally, the downlink CQI measurement result further includes a first offset value, and the first offset value is used to indicate a difference between a second CQI value of a subband measured by the first UE and the first CQI value.

Optionally, the sending unit 11 is configured to send an RRC message or DCI to the first UE. The RRC message or the DCI includes the resource indication information.

Optionally, the determining unit 10 is configured to determine the downlink CQI measurement resource from a system resource based on an uplink resource allocated to second UE by the base station. The downlink CQI measurement resource is a resource in the system resource other than the uplink resource for the second UE, both the first UE and the second UE are served by the base station, and the first UE and the second UE belong to different UE groups.

In an embodiment of the present invention, the sending unit 11 and the receiving unit 12 may be implemented by using a transceiver; and the determining unit 10 may be implemented by using one or more processors.

It can be understood that the base station in this embodiment may correspond to the base station in the CQI measurement method in the embodiment in FIG. 3 or FIG. 4, and the module division and/or functions of the modules of the base station in this embodiment are all intended to implement the method procedure shown in FIG. 3 or FIG. 4. To avoid repetition, details are not described herein again.

According to the base station provided in an embodiment of the present invention, the base station has indicated, to the first UE, the downlink CQI measurement resource for use by the first UE to perform downlink CQI measurement, and the bandwidth of the frequency domain resource included in the downlink CQI measurement resource is less than the system bandwidth. Therefore, the first UE does not perform measurement on the entire system bandwidth when performing downlink CQI measurement on the downlink CQI measurement resource. To be specific, when performing downlink CQI measurement, the UE does not treat an uplink signal sent by another UE to the base station as an interference signal to a downlink signal sent by the base station to the first UE, thereby improving accuracy of downlink CQI measurement performed by the first UE.

Figure 11:
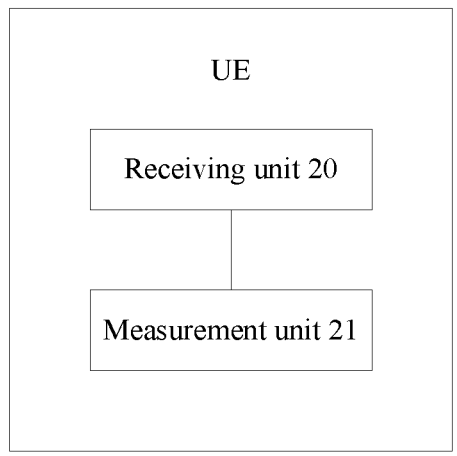
FIG. 11 is schematic structural diagram 1 of UE according to an embodiment of the present invention.

As shown in FIG. 11, an embodiment of the present invention provides UE. The UE is configured to perform operations performed by the first UE in the foregoing method. The UE may include modules corresponding to relevant operations. For example, the UE may include:

a receiving unit 20, configured to receive resource indication information from a base station, where the resource indication information is used to indicate a downlink CQI measurement resource, the downlink CQI measurement resource includes a frequency domain resource, and a bandwidth of the frequency domain resource is less than a system bandwidth; and a measurement unit 21, configured to perform downlink CQI measurement on the downlink CQI measurement resource received by the receiving unit 20.

Optionally, the frequency domain resource includes one set of to-be-measured subbands, and the one set of to-be-measured subbands includes at least one to-be-measured subband.

The measurement unit 21 is configured to perform downlink CQI measurement on the at least one to-be-measured subband.

Optionally, the resource indication information includes a number of the at least one to-be-measured subband.

Optionally, the downlink CQI measurement resource further includes a time domain resource, the frequency domain resource includes m sets of to-be-measured subbands, the time domain resource includes m to-be-measured time windows, the m sets of to-be-measured subbands are in a one-to-one correspondence with the m to-be-measured time windows, each set of to-be-measured subbands includes at least one to-be-measured subband, and each to-be-measured time window includes at least one to-be-measured subframe, where m is an integer greater than or equal to 1.

The measurement unit 21 is configured to perform downlink CQI measurement on at least one to-be-measured subband in each set of to-be-measured subbands and in a to-be-measured time window corresponding to the set of to-be-measured subbands.

Optionally, the resource indication information includes m subband number sets, m start subframe numbers, and m subframes, there is a one-to-one correspondence between the m subband number sets, the m start subframe numbers, and the m subframes, each subband number set includes a number of at least one to-be-measured subband in one set of to-be-measured subbands, and the one set of to-be-measured subbands is one of the m sets of to-be-measured subbands.

Figure 12:
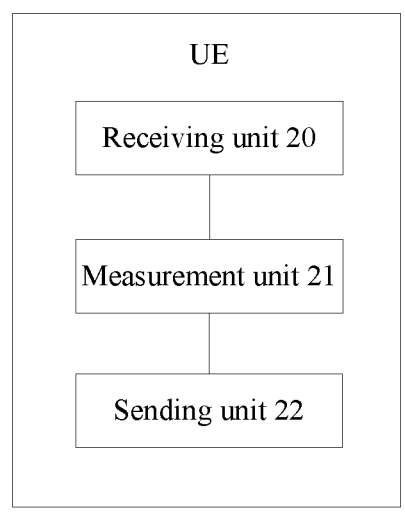
FIG. 12 is schematic structural diagram 2 of UE according to an embodiment of the present invention.

Optionally, with reference to FIG. 11, as shown in FIG. 12, the UE in an embodiment of the present invention may further include a sending unit 22.

The sending unit 22 is configured to: after the measurement unit 21 performs downlink CQI measurement on the downlink CQI measurement resource, send a downlink CQI measurement result to the base station. The downlink CQI measurement result includes a first CQI value measured by the measurement unit 21 on the downlink CQI measurement resource.

Optionally, the downlink CQI measurement result further includes a first offset value, and the first offset value is used to indicate a difference between a second CQI value of a subband measured by the measurement unit 21 and the first CQI value.

Optionally, the measurement unit 21 is configured to perform downlink CQI measurement on the downlink CQI measurement resource within a first time period. The first time period is a cycle for the UE to report the downlink CQI measurement result to the base station; or the first time period is from a subframe in which the base station sends a downlink CQI measurement instruction to the UE, to a subframe in which the UE reports the downlink CQI measurement result to the base station.

Optionally, the receiving unit 20 is configured to: receive an RRC message or DCI from the base station, where the RRC message or the DCI includes the resource indication information; and obtain the resource indication information based on the RRC message or the DCI.

In an embodiment of the present invention, the receiving unit 20 and the sending unit 22 may be implemented by using a transceiver; and the measurement unit 21 may be implemented by using one or more processors.

It can be understood that the UE in this embodiment may correspond to the UE in the CQI measurement method in the embodiment in FIG. 3 or FIG. 4, and the module division and/or functions of the modules of the UE in this embodiment are all intended to implement the method procedure shown in FIG. 3 or FIG. 4. To avoid repetition, details are not described herein again.

According to the UE provided in an embodiment of the present invention, the UE can perform downlink CQI measurement on the downlink CQI measurement resource indicated by the resource indication information sent by the base station, and the bandwidth of the frequency domain resource included in the downlink CQI measurement resource is less than the system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

Figure 13:
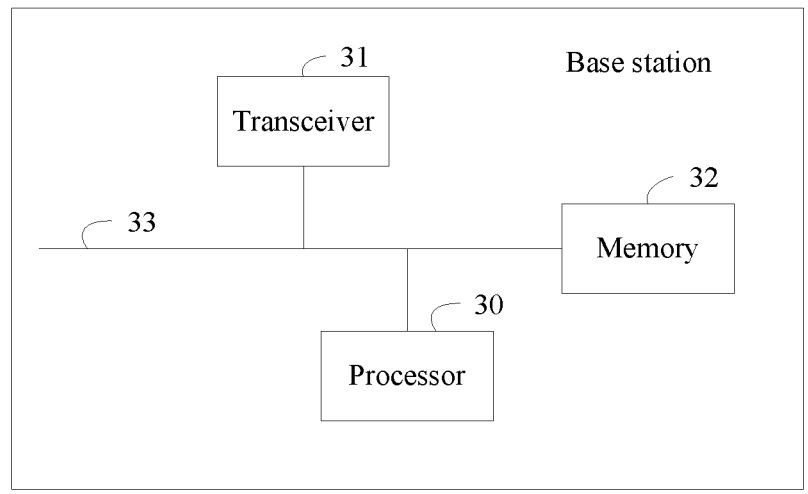
FIG. 13 is a schematic diagram of hardware of a base station according to an embodiment of the present invention.

As shown in FIG. 13, an embodiment of the present invention provides a base station. The base station includes at least one processor 30, a transceiver 31, a memory 32, and a system bus 33.

The memory 32 is configured to store a computer executable instruction; the at least one processor 30, the memory 32, and the transceiver 31 are connected to each other by using the system bus 33; and when the base station runs, the at least one processor 30 executes the computer executable instruction stored in the memory 32, so that the base station performs the CQI measurement method shown in FIG. 3 or FIG. 4. For the specific CQI measurement method, refer to related descriptions in the embodiment shown in FIG. 3 or FIG. 4, and details are not described herein again.

An embodiment further provides a storage medium. The storage medium may include the memory 32.

The at least one processor 30 may be a central processing unit (CPU). The at least one processor 30 may alternatively be another general-purpose processor, a digital signal processor (DSP), an application-specific integrated circuit (SIC), a field-programmable gate array (FPGA) or another programmable logic device, a discrete gate or transistor logic device, a discrete hardware component, or the like. The general-purpose processor may be a microprocessor, or the processor may be any normal processor, or the like.

The at least one processor 30 may be a dedicated processor. The dedicated processor may include any one of a baseband processing chip, a radio frequency processing chip, or the like. Further, the dedicated processor may further include a chip provided with another terminal-specific processing function.

The memory 32 may include a volatile memory, for example, a random-access memory (RAM). The memory 32 may alternatively include a non-volatile memory, for example, a read-only memory (ROM), a flash memory, a hard disk drive (HDD), or a solid-state drive (SSD). Alternatively, the memory 32 may include a combination of the foregoing types of memories.

The system bus 33 may include a data bus, a power bus, a control bus, a signal status bus, and the like. For clear description in this embodiment, various buses are marked as the system bus 33 in FIG. 13.

The transceiver 31 may be a wireless transceiver. For example, the wireless transceiver may be an antenna or the like of the base station. The at least one processor 30 receives data from and transmits data to another device, for example, UE, by using the transceiver 31.

In a specific implementation process, the operations in the method procedure shown in FIG. 3 or FIG. 4 may be implemented by executing, by the processor 30 in a hardware form, the computer executable instruction in a software form stored in the memory 32. To avoid repetition, details are not described herein again.

An embodiment of the present invention provides a computer readable storage medium. The computer readable storage medium stores one or more programs, the one or more programs include a computer executable instruction, and when at least one processor of a base station executes the computer executable instruction, the base station performs the CQI measurement method shown in FIG. 3 or FIG. 4.

According to the base station provided in an embodiment of the present invention, the base station has indicated, to the first UE, the downlink CQI measurement resource for use by the first UE to perform downlink CQI measurement, and the bandwidth of the frequency domain resource included in the downlink CQI measurement resource is less than the system bandwidth. Therefore, the first UE does not perform measurement on the entire system bandwidth when performing downlink CQI measurement on the downlink CQI measurement resource. To be specific, when performing downlink CQI measurement, the UE does not treat an uplink signal sent by another UE to the base station as an interference signal to a downlink signal sent by the base station to the first UE, thereby improving accuracy of downlink CQI measurement performed by the first UE.

Figure 14:
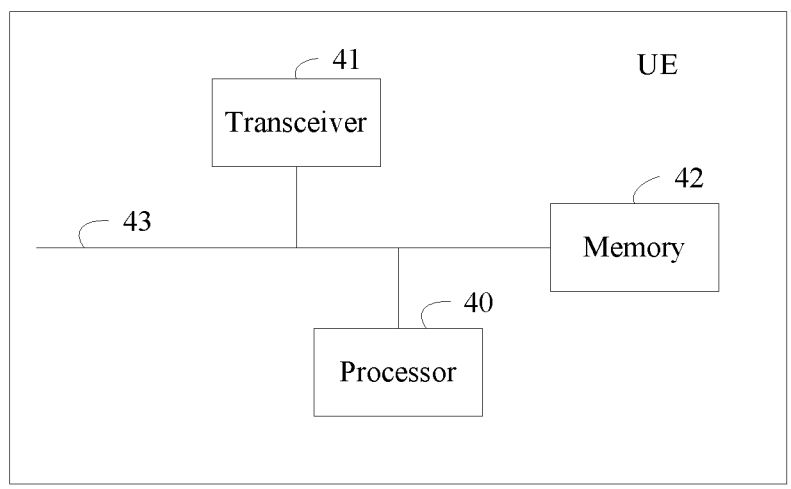
FIG. 14 is schematic diagram of hardware of UE according to an embodiment of the present invention.

As shown in FIG. 14, an embodiment of the present invention provides UE. The UE includes at least one processor 40, a transceiver 41, a memory 42, and a system bus 43.

The memory 42 is configured to store a computer executable instruction; the at least one processor 40, the memory 42, and the transceiver 41 are connected to each other by using the system bus 43; and when the UE runs, the at least one processor 40 executes the computer executable instruction stored in the memory 42, so that the UE performs the CQI measurement method shown in FIG. 3 or FIG. 4. For the specific CQI measurement method, refer to related descriptions in the embodiment shown in FIG. 3 or FIG. 4, and details are not described herein again.

An embodiment further provides a storage medium. The storage medium may include the memory 42.

The at least one processor 40 may be a CPU. The at least one processor 40 may alternatively be another general-purpose processor, a DSP, an ASIC, an FPGA or another programmable logic device, a discrete gate or transistor logic device, a discrete hardware component, or the like. The general-purpose processor may be a microprocessor, or the processor may be any normal processor, or the like.

The at least one processor 40 may be a dedicated processor. The dedicated processor may include any one of a baseband processing chip, a radio frequency processing chip, and the like. Further, the dedicated processor may further include a chip provided with another terminal-specific processing function.

The memory 42 may include a volatile memory, for example, a RAM. The memory 42 may alternatively include a non-volatile memory, for example, a ROM, a flash memory, an HDD, or an SSD. The memory 42 may alternatively include a combination of the foregoing types of memories.

The system bus 43 may include a data bus, a power bus, a control bus, a signal status bus, and the like. For clear description in this embodiment, various buses are marked as the system bus 43 in FIG. 14.

The transceiver 41 may be a wireless transceiver. For example, the wireless transceiver may be an antenna or the like of the UE. The at least one processor 40 receives data from and transmits data to another device, for example, a base station, by using the transceiver 41.

In a specific implementation process, the operations in the method procedure shown in FIG. 3 or FIG. 4 may be implemented by executing, by the processor 40 in a hardware form, the computer executable instruction in a software form stored in the memory 42. To avoid repetition, details are not described herein again.

An embodiment of the present invention provides a computer readable storage medium. The computer readable storage medium stores one or more programs, the one or more programs include a computer executable instruction, and when at least one processor of UE executes the computer executable instruction, the UE performs the CQI measurement method shown in FIG. 3 or FIG. 4.

According to the UE provided in an embodiment of the present invention, the UE can perform downlink CQI measurement on the downlink CQI measurement resource indicated by resource indication information sent by the base station, and the bandwidth of the frequency domain resource included in the downlink CQI measurement resource is less than the system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

An embodiment of the present invention provides a wireless communications system. The wireless communications system includes a base station and UE. For example, the wireless communications system provided in this embodiment of the present invention may be the wireless communications system shown in FIG. 1. In the wireless communications system, there may be a plurality of UEs.

In the wireless communications system provided in an embodiment of the present invention, for specific descriptions of the base station, refer to related descriptions of the base station in the embodiment shown in FIG. 9, FIG. 10, or FIG. 13, and for specific descriptions of the UE, refer to related descriptions of the UE in the embodiments shown in FIG. 11, FIG. 12, or FIG. 14, and details are not described herein again.

In the wireless communications system provided in an embodiment of the present invention, the base station performs the corresponding operations in the method procedure shown in FIG. 3 or FIG. 4, to complete the CQI measurement method in the embodiments of the present invention. Correspondingly, the UE performs the corresponding operations in the method procedure shown in FIG. 3 or FIG. 4, to complete the CQI measurement method in the embodiments of the present invention.

According to the wireless communications system provided in an embodiment of the present invention, the wireless communications system includes the base station and the UE. The base station can determine the downlink CQI measurement resource for use by the UE to perform downlink CQI measurement, and indicate the downlink CQI measurement resource to the UE by using the resource indication information, and the bandwidth of the frequency domain resource included in the downlink CQI measurement resource is less than the system bandwidth. Therefore, it can be ensured that the UE does not perform measurement on the entire system bandwidth when performing downlink CQI measurement. To be specific, when performing downlink CQI measurement, the UE does not treat an uplink signal sent by another UE to the base station as an interference signal to a downlink signal sent by the base station to the UE, thereby improving accuracy of downlink CQI measurement performed by the UE.

Further, in the wireless communications system provided in an embodiment of the present invention, because the accuracy of downlink CQI measurement performed by first UE can be improved, it can be ensured that the base station performs more accurate downlink channel quality estimation, so that the UE can obtain a proper downlink resource allocated to the UE by the base station.

It may be clearly understood by a person skilled in the art that, for the purpose of convenient and brief description, descriptions are made by using only division into the foregoing function modules as an example. In actual application, the foregoing functions can be allocated to different function modules for implementation depending on requirements. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units.

The units described as separate parts may or may not be physically separate. Parts displayed as units may or may not be physical units, and may be located in one position or distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of a software function unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The software product is stored in a storage medium, and includes several instructions for instructing a computer device (which may be a personal computer, a server, a network device, or the like) to perform all or some of the operations of the method described in the embodiments of this application. The storage medium is a non-transitory medium, and includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel quality indicator (CQI) measurement method, comprising:

receiving, by user equipment (UE), resource indication information from a base station, wherein the resource indication information is used to indicate a downlink CQI measurement resource, the downlink CQI measurement resource comprises a frequency domain resource, and a bandwidth of the frequency domain resource is less than a system bandwidth, wherein the downlink CQI measurement resource is specified by the base station based on an uplink resource allocated to an another UE by the base station;

performing, by the UE, downlink CQI measurement on the downlink CQI measurement resource, wherein the downlink CQI measurement resource further comprises a time domain resource, the frequency domain resource comprises m sets of to-be-measured subbands, the time domain resource comprises m to-be-measured time windows, the m sets of to-be-measured subbands are in a one-to-one correspondence with the m to-be-measured time windows, each set of to-be-measured subbands comprises at least one to-be-measured subband, and each to-be-measured time window comprises at least one to-be-measured subframe, wherein m is an integer greater than or equal to 1, wherein a first set of the m sets of to-be-measured subbands corresponding to a first of the m to-be-measured time windows is different than a second set of the m sets of to-be-measured subbands corresponding to a second of the m to-be-measured time windows; and sending, by the UE, a downlink CQI measurement result to the base station, wherein the downlink CQI measurement result comprises a first CQI value measured by the UE on the downlink CQI measurement resource, wherein the downlink CQI measurement result further comprises a first offset value, and the first offset value is used to indicate a difference between a second CQI value of a subband measured by the UE and the first CQI value.

2. The CQI measurement method according to claim 1, wherein the frequency domain resource comprises one set of subbands to be measured having at least one to-be-measured subband; and the performing, by the UE, downlink CQI measurement on the downlink CQI measurement resource comprises:

performing, by the UE, downlink CQI measurement on the at least one to-be-measured subband.

3. The CQI measurement method according to claim 2, wherein the resource indication information comprises a number of the at least one to-be-measured subband.

4. The CQI measurement method according to claim 1, wherein the performing, by the UE, downlink CQI measurement on the downlink CQI measurement resource comprises:

performing, by the UE, downlink CQI measurement on at least one to-be-measured subband in each set of to-be-measured subbands and in a to-be-measured time window corresponding to the set of to-be-measured subbands.

5. The CQI measurement method according to claim 4, wherein the resource indication information comprises m subband number sets, m start subframe numbers, and m subframes, there is a one-to-one correspondence between the m subband number sets, the m start subframe numbers, and the m subframes, each subband number set comprises a number of at least one to-be-measured subband in one set of to-be-measured subbands, and the one set of to-be-measured subbands is one of the m sets of to-be-measured subbands.

6. The CQI measurement method according to claim 1, wherein the performing, by the UE, downlink CQI measurement on the downlink CQI measurement resource comprises:

performing, by the UE, downlink CQI measurement on the downlink CQI measurement resource within a first time period, wherein the first time period is a cycle for the UE to report the downlink CQI measurement result of downlink CQI measurement performed by the UE to the base station, or the first time period is from a subframe in which the base station sends, to the UE, an instruction instructing the UE to perform downlink CQI measurement, to a subframe in which the UE reports the downlink CQI measurement result to the base station.

7. The CQI measurement method according to claim 1, wherein the receiving, by UE, resource indication information from a base station comprises:

receiving, by the UE, a radio resource control (RRC) message or downlink control information (DCI) from the base station, wherein the RRC message or the DCI comprises the resource indication information; and obtaining, by the UE, the resource indication information based on the RRC message or the DCI.

8. User Equipment (UE), comprising:

a transceiver;

a processor; and a non-transitory computer-readable storage medium storing a program to be executed by the processor, the program including instructions to cause:

the transceiver to receive resource indication information from a base station, wherein the resource indication information is used to indicate a downlink channel quality indicator (CQI) measurement resource, the downlink CQI measurement resource comprises a frequency domain resource, and a bandwidth of the frequency domain resource is less than a system bandwidth, wherein the downlink CQI measurement resource is specified by the base station based on an uplink resource allocated to an another UE by the base station; and the processor to perform downlink CQI measurement on the downlink CQI measurement resource received by the transceiver, wherein the downlink CQI measurement resource further comprises a time domain resource, the frequency domain resource comprises m sets of to-be-measured subbands, the time domain resource comprises m to-be-measured time windows, the m sets of to-be-measured subbands are in a one-to-one correspondence with the m to-be-measured time windows, each set of to-be-measured subbands comprises at least one to-be-measured subband, and each to-be-measured time window comprises at least one to-be-measured subframe, wherein m is an integer greater than or equal to 1, wherein a first set of the m sets of to-be-measured subbands corresponding to a first of the m to-be-measured time windows is different than a second set of the m sets of to-be-measured subbands corresponding to a second of the m to-be-measured time windows, wherein the transceiver is further caused to: send a downlink CQI measurement result to the base station, wherein the downlink CQI measurement result comprises a first CQI value measured by the processor on the downlink CQI measurement resource, wherein the downlink CQI measurement result further comprises a first offset value, and the first offset value is used to indicate a difference between a second CQI value of a subband measured by the processor and the first CQI value.

9. The UE according to claim 8, wherein the frequency domain resource comprises one set of subbands to be measured having at least one to-be-measured subband; and the processor is configured to perform downlink CQI measurement on the at least one to-be-measured subband.

10. The UE according to claim 9, wherein
the resource indication information comprises a number of the at least one to-be-measured subband.

11. The UE according to claim 8, wherein
the processor is configured to perform downlink CQI measurement on at least one to-be-measured subband in each set of to-be-measured subbands and in a to-be-measured time window corresponding to the set of to-be-measured subbands.

12. The UE according to claim 11, wherein
the resource indication information comprises m subband number sets, m start subframe numbers, and m subframes, wherein there is a one-to-one correspondence between the m subband number sets, the m start subframe numbers, and the m subframes, wherein each subband number set comprises a number of at least one to-be-measured subband in one set of to-be-measured subbands, and the one set of to-be-measured subbands is one of the m sets of to-be-measured subbands.

13. The UE according to claim 8, wherein
the processor is configured to perform downlink CQI measurement on the downlink CQI measurement resource within a first time period, wherein the first time period is a cycle for the UE to report the downlink CQI measurement result of downlink CQI measurement performed by the UE to the base station, or the first time period is from a subframe in which the base station sends, to the UE, an instruction instructing the UE to perform downlink CQI measurement, to a subframe in which the UE reports the downlink CQI measurement result to the base station.

14. The UE according to claim 8, wherein
the transceiver is configured to: receive a radio resource control (RRC) message or downlink control information (DCI) from the base station, wherein the RRC message or the DCI comprises the resource indication information; and obtain the resource indication information based on the RRC message or the DCI.

15. A wireless communications system, comprising the user equipment (UE) according to claim 8.

16. A computer program product stored in a non-transitory medium, comprising instructions which, when executed by a computer, cause the computer to:
receive resource indication information from a base station, wherein the resource indication information is used to indicate a downlink CQI measurement resource, the downlink CQI measurement resource comprises a frequency domain resource, and a bandwidth of the frequency domain resource is less than a system bandwidth, wherein the downlink CQI measurement resource is specified by the base station based on an uplink resource allocated to an another UE by the base station;
perform downlink CQI measurement on the downlink CQI measurement resource,
wherein the downlink CQI measurement resource further comprises a time domain resource, the frequency domain resource comprises m sets of to-be-measured subbands, the time domain resource comprises m to-be-measured time windows, the m sets of to-be-measured subbands are in a one-to-one correspondence with the m to-be-measured time windows, each set of to-be-measured subbands comprises at least one to-be-measured subband, and each to-be-measured time window comprises at least one to-be-measured subframe, wherein m is an integer greater than or equal to 1, wherein a first set of the m sets of to-be-measured subbands corresponding to a first of the m to-be-measured time windows is different than a second set of the m sets of to-be-measured subbands corresponding to a second of the m to-be-measured time windows; and
send a downlink CQI measurement result to the base station, wherein the downlink CQI measurement result comprises a first CQI value measured by the UE on the downlink CQI measurement resource, wherein
the downlink CQI measurement result further comprises a first offset value, and the first offset value is used to indicate a difference between a second CQI value of a subband measured by the UE and the first CQI value.

* * * * *